(12) United States Patent
Szatmary et al.

(10) Patent No.: US 11,940,805 B2
(45) Date of Patent: Mar. 26, 2024

(54) SYSTEMS AND METHODS FOR ENHANCING PERFORMANCE AND MAPPING OF ROBOTS USING MODULAR DEVICES

(71) Applicant: Brain Corporation, San Diego, CA (US)

(72) Inventors: Botond Szatmary, San Diego, CA (US); David Ross, San Diego, CA (US)

(73) Assignee: Brain Corporation, San Diego, CA (US)

( * ) Notice: Subject to any disclaimer, the term of this patent is extended or adjusted under 35 U.S.C. 154(b) by 0 days.

(21) Appl. No.: 17/313,077

(22) Filed: May 6, 2021

(65) Prior Publication Data

US 2021/0349471 A1 Nov. 11, 2021

Related U.S. Application Data

(60) Provisional application No. 63/020,667, filed on May 6, 2020.

(51) Int. Cl.
*G05D 1/02* (2020.01)
*B60W 60/00* (2020.01)
(Continued)

(52) U.S. Cl.
CPC ....... *G05D 1/024* (2013.01); *B60W 60/00256* (2020.02); *G01C 21/3837* (2020.08);
(Continued)

(58) Field of Classification Search
CPC ............... G05D 1/0274; G05D 1/0251; G05D 2201/0216; G05D 2201/0203; G05D 1/0221; G05D 1/0246; G05D 1/0282; G05D 1/024; G01C 21/3837; G01C 21/3804; B60W 60/00256; B60W 2420/52; B60W 2420/42; G06K 9/00664; G06K 9/46; H04N 5/247; H04N 5/232; H04N 23/90;
(Continued)

(56) References Cited

U.S. PATENT DOCUMENTS

2016/0188977 A1* 6/2016 Kearns ................. G06V 40/172
348/113
2017/0225332 A1* 8/2017 Deyle ..................... B25J 5/007
(Continued)

FOREIGN PATENT DOCUMENTS

CN  207155772 U  *  3/2018
CN  207155772 U     3/2018
CN  110750097 A     2/2020

OTHER PUBLICATIONS

International Search Report and Written Opinion for PCT/US21/31008, dated Oct. 21, 2021.

*Primary Examiner* — Nga X Nguyen
(74) *Attorney, Agent, or Firm* — Reed Smith LLP; Sidharth Kapoor

(57) ABSTRACT

Systems and methods for enhancing task performance and computer readable maps produced by robots using modular sensors is disclosed herein. According to at least one non-limiting exemplary embodiment, robots may perform a first set of tasks, wherein coupling one or more modular sensors to the robots may configure a robot to perform a second set of tasks, the second set of tasks includes the first set of tasks and at least one additional task.

20 Claims, 16 Drawing Sheets

(51) Int. Cl.
*G01C 21/00* (2006.01)
*G01S 17/89* (2020.01)
*G05D 1/00* (2006.01)
*G06K 9/00* (2022.01)
*G06K 9/46* (2006.01)
*G06V 20/10* (2022.01)
*H04N 5/247* (2006.01)
*H04N 23/90* (2023.01)

(52) U.S. Cl.
CPC ............ *G01S 17/89* (2013.01); *G05D 1/0251* (2013.01); *G05D 1/0274* (2013.01); *G06V 20/10* (2022.01); *H04N 23/90* (2023.01); *B60W 2420/42* (2013.01); *B60W 2420/52* (2013.01); *G05D 2201/0203* (2013.01); *G05D 2201/0216* (2013.01)

(58) Field of Classification Search
CPC ......... H04N 23/60; G01S 17/89; G01S 17/86; G01S 17/88; G06V 10/40; G06V 20/10
See application file for complete search history.

(56) References Cited

U.S. PATENT DOCUMENTS

| | | | |
|---|---|---|---|
| 2018/0085798 A1* | 3/2018 | Starr | B08B 9/049 |
| 2018/0206687 A1* | 7/2018 | Kim | A47L 9/28 |
| 2019/0235512 A1* | 8/2019 | Sinyavskiy | G05D 1/0238 |
| 2019/0248007 A1* | 8/2019 | Duffy | B25J 15/0066 |
| 2020/0073401 A1 | 3/2020 | Szatmary et al. | |
| 2020/0130197 A1* | 4/2020 | Roh | B25J 13/003 |
| 2020/0278689 A1* | 9/2020 | Larson | G05D 1/0242 |

\* cited by examiner

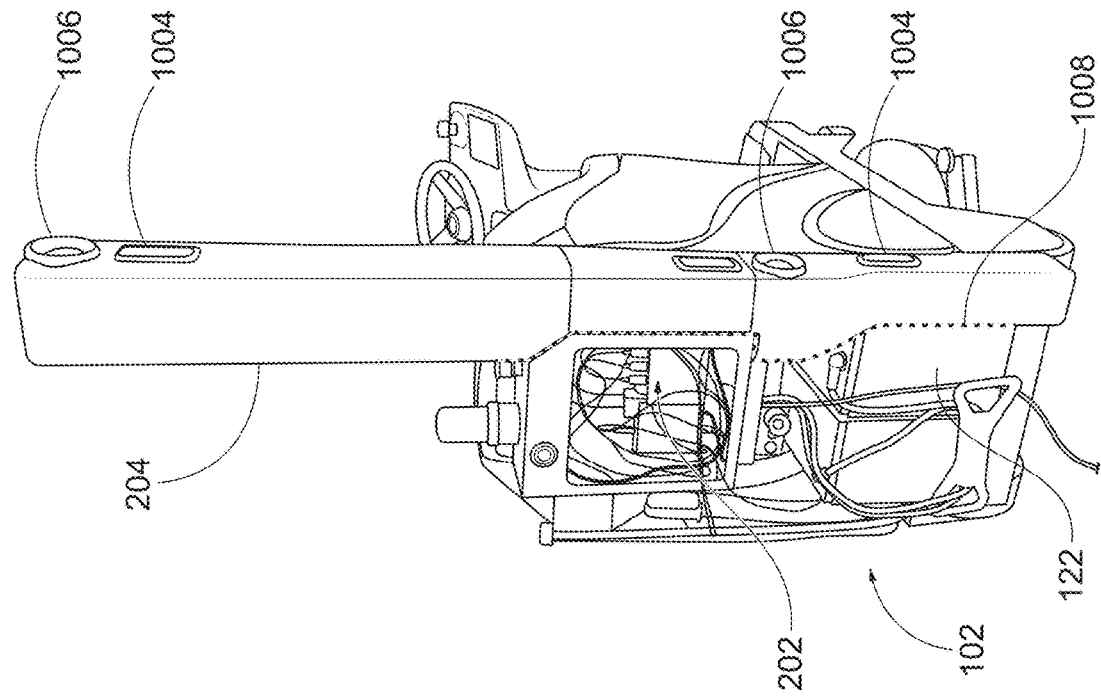
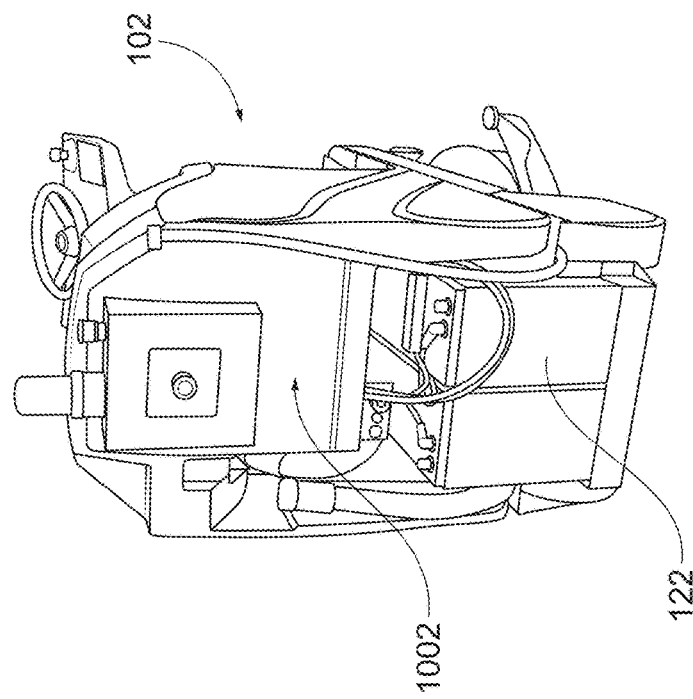
FIG. 10B
FIG. 10A

SYSTEMS AND METHODS FOR ENHANCING PERFORMANCE AND MAPPING OF ROBOTS USING MODULAR DEVICES

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present application relates generally to robotics, and more specifically to systems and methods for enhancing performance and mapping of robots using modular devices.

SUMMARY

Exemplary embodiments described herein have innovative features, no single one of which is indispensable or solely responsible for their desirable attributes. Without limiting the scope of the claims, some of the advantageous features will now be summarized. One skilled in the art would appreciate that, as used herein, the term robot may generally refer to an autonomous vehicle or object that travels a route, executes a task, or otherwise moves automatically upon executing or processing computer-readable instructions.

According to at least one non-limiting exemplary embodiment, a robotic system is disclosed. The robotic system may include a non-transitory computer-readable memory comprising instructions embodied thereon and at least one processor configurable to execute the instructions to: perform a first set of autonomous tasks by, in part, producing computer-readable maps of an environment using data from a first set of sensors; couple to a sensory module, the sensory module being configurable to collect data corresponding to internal or external characteristics of the robotic system and; produce a computer-readable map based on data from the first set of sensors and the sensory module.

According to at least one non-limiting exemplary embodiment, the sensory module comprises a connection interface that couples to a respective connection interface of the robotic system.

According to at least one non-limiting exemplary embodiment, the connection interface of the sensory module is configured based in part on a shape of a chassis or body of the robotic system.

According to at least one non-limiting exemplary embodiment, the first sensory module may be coupled and decoupled from the robotic system without modifications to a chassis of the robotic system.

According to at least one non-limiting exemplary embodiment, the sensory module is inoperable prior to being coupled to the at least one processor.

According to at least one non-limiting exemplary embodiment, at least one processor of the robotic system is further configured to execute the instructions to: couple a second different sensory module, the second sensory module being coupled to the first sensory module, the first and second sensory module being in communication with the at least one processor of the robotic system, data from the second different sensory module being utilized in conjunction with the first sensory module and first set of sensors produce or generate computer-readable maps.

According to at least one non-limiting exemplary embodiment, at least one processor of the robotic system is further configured to execute the instructions to: perform a second set of autonomous tasks with the sensory module coupled to the at least one processor; the second set of autonomous tasks includes all of the tasks of the first set of tasks and one or more additional tasks.

According to at least one non-limiting exemplary embodiment, the first sensory module includes one of a camera and lights component, a light-detecting and ranging sensory component, a depth camera component, or one or more internal monitoring sensor components.

According to at least one non-limiting exemplary embodiment, the first sensory module includes one or more processors configurable to receive and execute computer-readable instructions received by the at least one processor of the robotic system.

According to at least one non-limiting exemplary embodiment, executing the computer-readable instructions by one or more processors configures the one or more processors of the first sensory module to execute an image-recognition model, the image-recognition model being configured to identify features sensed by either the first set of sensors or the first sensory module.

According to at least one non-limiting exemplary embodiment, a module for use on a robot is disclosed. The module, comprises: at least one camera; a communications unit configured to communicate with a controller of the robot; and a non-transitory computer-readable storage medium having computer-readable instructions thereon which, when executed by a processor of the module, causes the processor to: capture images of objects as the robot navigates a route in response to signals from the controller; and communicate the images to a server to cause the server to identify at least one feature within the images.

According to at least one non-limiting exemplary embodiment, the module further comprises instructions stored on the non-transitory computer-readable medium which configures the processor to: receive location data from the controller of the robot; and correlate each image captured by the at least one camera to a current location of the robot.

According to at least one non-limiting exemplary embodiment, the module further comprises instructions stored on the non-transitory computer-readable medium which configures the processor to: activate or deactivate a light of the module based on a location of the robot.

According to at least one non-limiting exemplary embodiment, the module extends vertically from the robotic body upward to position the at least one camera at a height above the robot.

According to at least one non-limiting exemplary embodiment, the module further comprises: a LiDAR sensor comprising a field of view encompassing a region above the robot, the region being in front of the module along a direction of travel of the robot.

According to at least one non-limiting exemplary embodiment, the module is configured to be coupled to at least one of a floor cleaning robot or an item delivery robot.

According to at least one non-limiting exemplary embodiment, the processor of the module is a slave device to the controller of the robot.

According to at least one non-limiting exemplary embodiment, the module further comprises: an upper steel camera configured to image objects, the upper steel camera is angled upward at an at least 20° angle with respect to the at least one camera module.

According to at least one non-limiting exemplary embodiment, the module further comprises instructions stored on the non-transitory computer-readable medium which configures the processor to: receive image data from a second module coupled to the module, the images are captured by a second camera of the second module, the second camera being angled upward at an at least 20° with respect to the at least one camera of the module.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a," "an," and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 10A-B illustrates a robot of a default make or model being coupled to a sensory module for use in part in enhancing computer-readable maps, according to an exemplary embodiment.

Figure 1A:
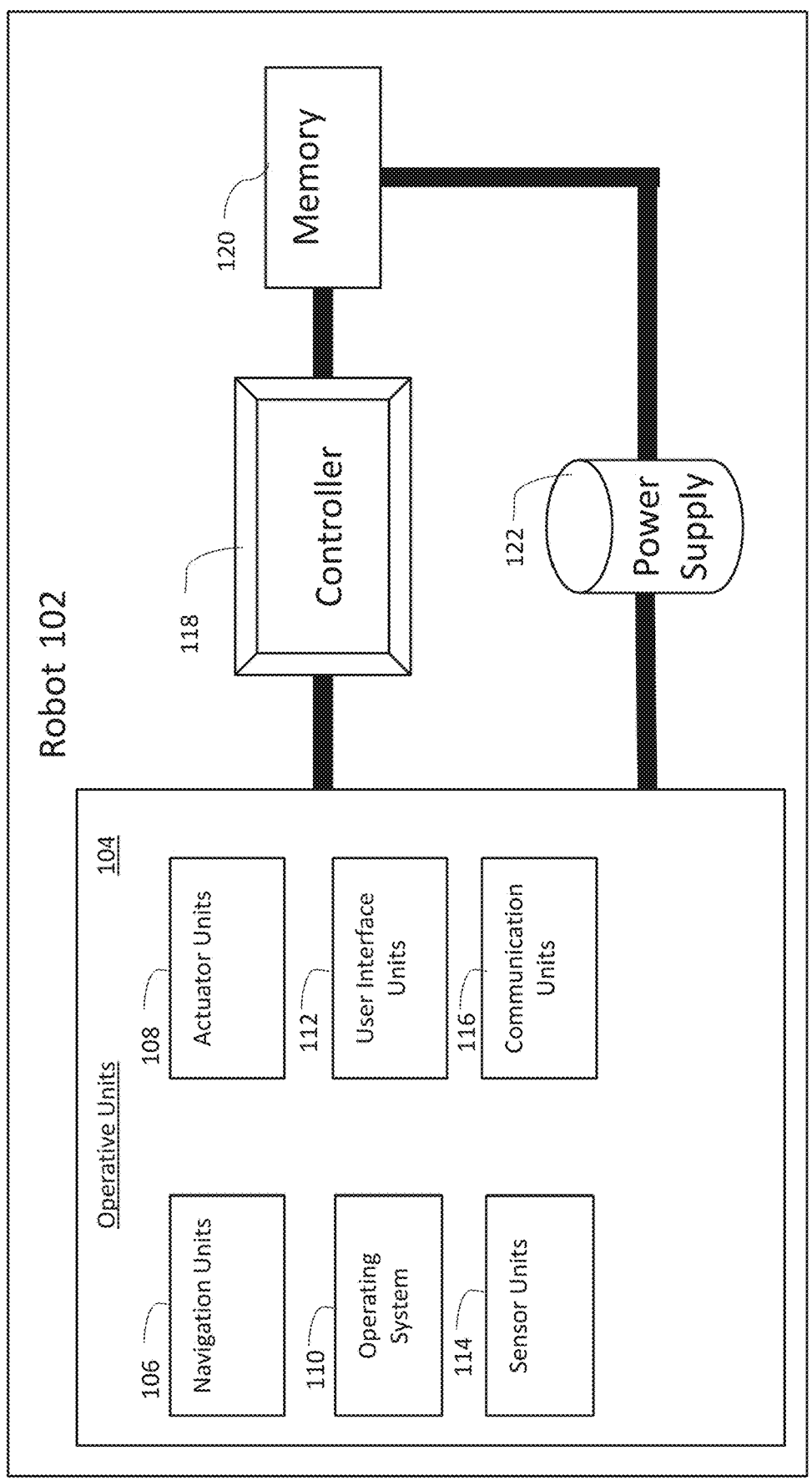
FIG. 1A is a functional block diagram of a main robot in accordance with some embodiments of this disclosure.

All Figures disclosed herein are © Copyright 2021 Brain Corporation. All rights reserved.

DETAILED DESCRIPTION

Many commercial robots of a certain make or model are produced by a single manufacturer. These robots may be configurable to perform a specific task or set of tasks. In some instances, these robots may be capable of performing other tasks in addition to their original specified function(s) but are limited by hardware. For example, robots in performing their specified functions may only occupy 50% of their processor bandwidth, allowing for another 50% for additional functions.

In some instances, commercial robots of a certain make or model may comprise defects which may be discovered at later times, and that require upgrading of their capabilities after deployment in the environment. For example, a sensor configuration of a certain model of robot may comprise a blind spot. The blind spot may have little impact on robots of the model of robot in some environments but may drastically impact performance of robots of the same model in other environments. Updating hardware for many robots in many separate locations to cover the blind spot may be both inefficient and costly for robot manufacturers and operators of robots.

In some instances, robot operators may desire to expand capabilities of their robots to enable them to perform a specific task unique to an environment. For example, a robot manufacturer may produce cleaning robots, wherein a customer may operate one of the many robots produced in a grocery store. The customer may desire the robot to, in addition to cleaning, identify items on a shelf, which may require the configuration of additional lights and sensors on the cleaning robot. Accordingly, there is a need in the art for systems and methods for enhancing performance and mapping of robots using modular devices.

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for systems and methods for enhancing performance and mapping of robots using modular devices. As used herein, a robot may include mechanical and/or virtual entities configured to carry out a complex series of tasks or actions autonomously. In some exemplary embodiments, robots may be machines that are guided and/or instructed by computer programs and/or electronic circuitry. In some exemplary embodiments, robots may include electro-mechanical components that are configured for navigation, where the robot may move from one location to another. Such robots may include autonomous and/or semi-autonomous cars, floor cleaners, rovers, drones, planes, boats, carts, trams, wheelchairs, industrial equipment, stocking machines, mobile platforms, personal transportation devices (e.g., hover boards, scooters, self-balancing vehicles such as manufactured by Segway, etc.), stocking machines, trailer movers, vehicles, and the like. Robots may also include any autonomous and/or semi-autonomous machine for transporting items, people, animals, cargo, freight, objects, luggage, and/or anything desirable from one location to another.

As used herein, a feature may comprise one or more numeric values (e.g., floating point, decimal, a tensor of values, etc.) characterizing an input from a sensor unit 114 of a robot 102, described in FIG. 1A below, including, but not limited to, detection of an object, parameters of the object (e.g., size, shape, color, orientation, edges, etc.), color values of pixels of an image, depth values of pixels of a depth image, brightness of an image, the image as a whole, changes of features over time (e.g., velocity, trajectory, etc. of an object), sounds, spectral energy of a spectrum bandwidth, motor feedback (i.e., encoder values), sensor values (e.g., gyroscope, accelerometer, GPS, magnetometer, etc. readings), a binary categorical variable, an enumerated type, a character/string, or any other characteristic of a sensory input. For example, a feature of an environment may comprise a shelf, and a feature of the shelf may be an item on display to be sold. As another example, a feature may comprise a price tag, bar code, artwork, or other 2-dimensional pattern.

As used herein, network interfaces may include any signal, data, or software interface with a component, network, or process including, without limitation, those of the FireWire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coax-sys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, LTE/LTE-A/TD-LTE/TD-LTE, GSM, etc.), IrDA families, etc. As used herein, Wi-Fi may include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

As used herein, processor, microprocessor, and/or digital processor may include any type of digital processor such as, without limitation, digital signal processors ("DSPs"), reduced instruction set computers ("RISC"), complex instruction set computers ("CISC") processors, microprocessors, gate arrays (e.g., field programmable gate arrays ("FPGAs")), programmable logic device ("PLDs"), reconfigurable computer fabrics ("RCFs"), array processors, secure microprocessors and application-specific integrated circuits ("ASICs"). Such digital processors may be contained on a single unitary integrated circuit die or distributed across multiple components.

As used herein, computer program and/or software may include any sequence or human or machine-cognizable steps that perform a function. Such computer program and/or software may be rendered in any programming language or environment including, for example, C/C++, C#, Fortran, COBOL, MATLAB™, PASCAL, GO, RUST, SCALA, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and the like.

As used herein, connection, link, and/or wireless link may include a causal link between any two or more entities (whether physical or logical/virtual), which enables information exchange between the entities.

As used herein, computer and/or computing device may include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

Detailed descriptions of the various embodiments of the system and methods of the disclosure are now provided. While many examples discussed herein may refer to specific exemplary embodiments, it will be appreciated that the described systems and methods contained herein are applicable to any kind of robot. Myriad other embodiments or uses for the technology described herein would be readily envisaged by those having ordinary skill in the art, given the contents of the present disclosure.

Advantageously, the systems and methods of this disclosure at least: (i) enhance navigation capabilities of robots; (ii) enhance user customization of robots to perform environment-specific tasks; (iii) enhance data gathering of robots to produce insightful information to humans and/or robots; and (iv) improve ability of robot manufacturers and designers to quickly upgrade capabilities of existing robots. Other advantages are readily discernable by one having ordinary skill in the art given the contents of the present disclosure.

FIG. 1A is a functional block diagram of a robot 102 in accordance with some principles of this disclosure. As illustrated in FIG. 1A, robot 102 may include controller 118, memory 120, user-interface unit 112, sensor units 114, navigation units 106, actuator unit 108, and communications unit 116, as well as other components and subcomponents (e.g., some of which may not be illustrated). Although a specific embodiment is illustrated in FIG. 1A, it is appreciated that the architecture may be varied in certain embodiments as would be readily apparent to one of ordinary skill given the contents of the present disclosure. As used herein, robot 102 may be representative at least in part of any robot described in this disclosure.

Figure 1B:
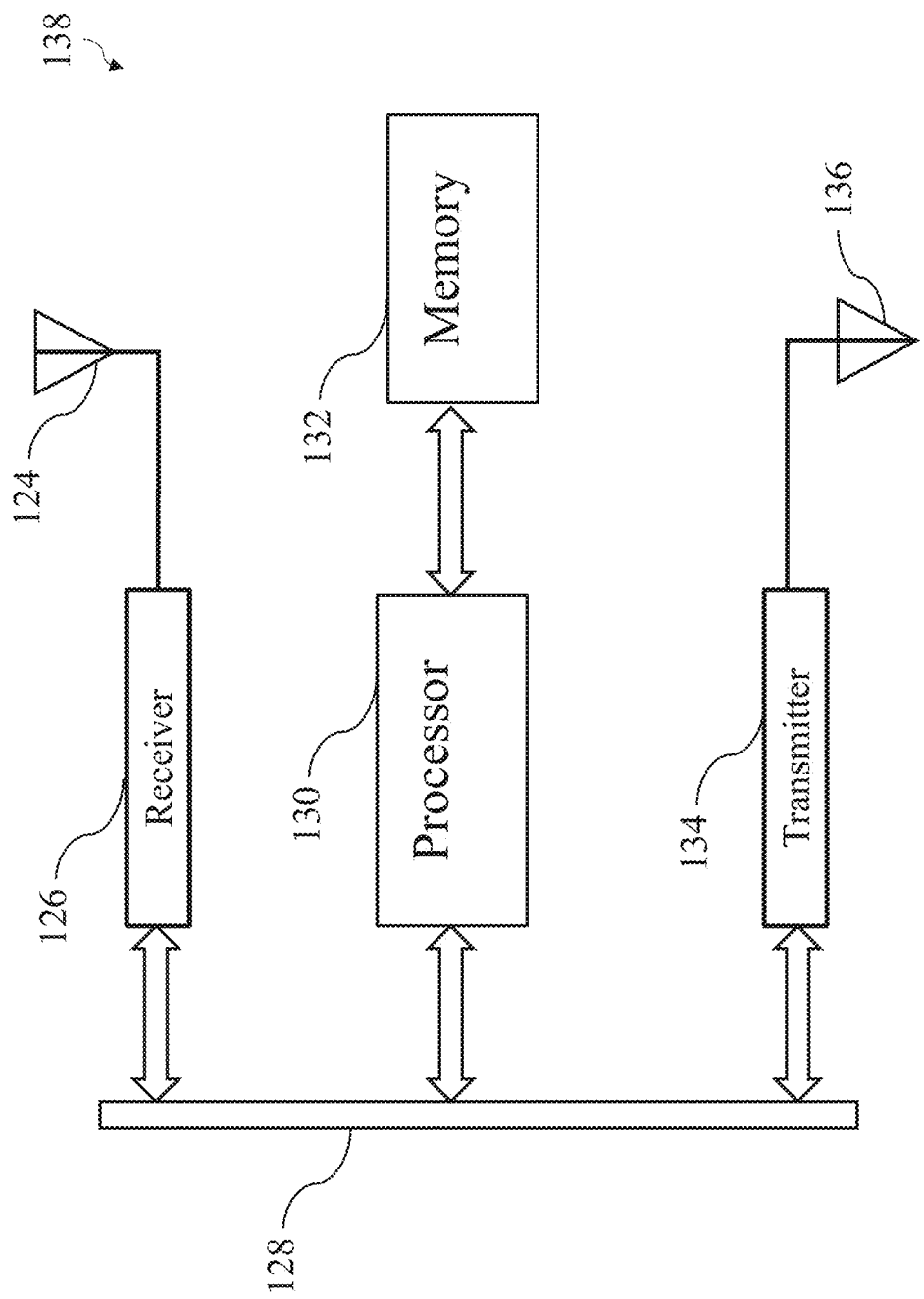
FIG. 1B is a functional block diagram of a controller or processor in accordance with some embodiments of this disclosure.

Controller 118 may control the various operations performed by robot 102. Controller 118 may include and/or comprise one or more processors or processing devices (e.g., microprocessors), as illustrated in FIG. 1B, and other peripherals. As previously mentioned and used herein, processor, microprocessor, and/or digital processor may include any type of digital processor such as, without limitation, digital signal processors ("DSPs"), reduced instruction set computers ("RISC"), complex instruction set computers ("CISC"), microprocessors, gate arrays (e.g., field programmable gate arrays ("FPGAs")), programmable logic device ("PLDs"), reconfigurable computer fabrics ("RCFs"), array processors, secure microprocessors and application-specific integrated circuits ("ASICs"). Peripherals may include hardware accelerators configured to perform a specific function using hardware elements such as, without limitation, encryption/description hardware, algebraic processors (e.g., tensor processing units, quadratic problem solvers, multipliers, etc.), data compressors, encoders, arithmetic logic units ("ALU"), and the like. Such digital processors may be contained on a single unitary integrated circuit die, or distributed across multiple components.

Controller 118 may be operatively and/or communicatively coupled to memory 120. Memory 120 may include any type of integrated circuit or other storage device configured to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RLDRAM"), static RAM ("SRAM"), flash memory (e.g., NAND/NOR), memristor memory, pseudostatic RAM ("PSRAM"), etc. Memory 120 may provide instructions and data to controller 118. For example, memory 120 may be a non-transitory, computer-readable storage apparatus and/or medium having a plurality of instructions stored thereon, the instructions being executable by a processing apparatus (e.g., controller 118) to operate robot 102. In some cases, the instructions may be configured to, when executed by the processing apparatus, cause the processing apparatus to perform the various methods, features, and/or functionality described in this disclosure. Accordingly, controller 118 may perform logical and/or arithmetic operations based on program instructions stored within memory 120. In some cases, the instructions and/or data of memory 120 may be stored in a combination of hardware, some located locally within robot 102, and some located remote from robot 102 (e.g., in a cloud, server, network, etc.).

It should be readily apparent to one of ordinary skill in the art that a processor may be internal to or on board robot 102 and/or may be external to robot 102 and be communicatively coupled to controller 118 of robot 102 utilizing communication units 116 wherein the external processor may receive data from robot 102, process the data, and transmit computer-readable instructions back to controller 118. In at least one non-limiting exemplary embodiment, the processor may be on a remote server (not shown).

In some exemplary embodiments, memory 120, shown in FIG. 1A, may store a library of sensor data. In some cases, the sensor data may be associated at least in part with objects and/or people. In exemplary embodiments, this library may include sensor data related to objects and/or people in different conditions, such as sensor data related to objects and/or people with different compositions (e.g., materials, reflective properties, molecular makeup, etc.), different lighting conditions, angles, sizes, distances, clarity (e.g., blurred, obstructed/occluded, partially off frame, etc.), colors, surroundings, and/or other conditions. The sensor data in the library may be taken by a sensor (e.g., a sensor of sensor units 114 or any other sensor) and/or generated automatically, such as with a computer program that is configured to generate/simulate (e.g., in a virtual world) library sensor data (e.g., which may generate/simulate these library data entirely digitally and/or beginning from actual sensor data) from different lighting conditions, angles, sizes, distances, clarity (e.g., blurred, obstructed/occluded, partially off frame, etc.), colors, surroundings, and/or other conditions. The number of images in the library may depend at least in part on one or more of the amount of available data, the variability of the surrounding environment in which robot 102 operates, the complexity of objects and/or people, the variability in appearance of objects, physical properties of robots, the characteristics of the sensors, and/or the amount of available storage space (e.g., in the library, memory 120, and/or local or remote storage). In exemplary embodiments, at least a portion of the library may be stored on a network (e.g., cloud, server, distributed network, etc.) and/or may not be stored completely within memory 120. As yet another exemplary embodiment, various robots (e.g., that are commonly associated, such as robots by a common manufacturer, user, network, etc.) may be networked so that data captured by individual robots are collectively shared with other robots. In such a fashion, these robots may be configured to learn and/or share sensor data in order to facilitate the ability to readily detect and/or identify errors and/or assist events.

Still referring to FIG. 1A, operative units 104 may be coupled to controller 118, or any other controller, to perform the various operations described in this disclosure. One, more, or none of the modules in operative units 104 may be included in some embodiments. Throughout this disclosure, reference may be to various controllers and/or processors. In some embodiments, a single controller (e.g., controller 118) may serve as the various controllers and/or processors described. In other embodiments different controllers and/or processors may be used, such as controllers and/or processors used particularly for one or more operative units 104. Controller 118 may send and/or receive signals, such as power signals, status signals, data signals, electrical signals, and/or any other desirable signals, including discrete and analog signals to operative units 104. Controller 118 may coordinate and/or manage operative units 104, and/or set timings (e.g., synchronously or asynchronously), turn off/on control power budgets, receive/send network instructions and/or updates, update firmware, send interrogatory signals, receive and/or send statuses, and/or perform any operations for running features of robot 102.

Returning to FIG. 1A, operative units 104 may include various units that perform functions for robot 102. For example, operative units 104 include at least navigation units 106, actuator units 108, user-interface units 112, sensor units 114, and communication units 116. Operative units 104 may also comprise other units such as specifically configured task units (not shown) that provide the various functionality of robot 102. In exemplary embodiments, operative units 104 may be instantiated in software, hardware, or both software and hardware. For example, in some cases, units of operative units 104 may comprise computer-implemented instructions executed by a controller. In exemplary embodiments, units of operative unit 104 may comprise hardcoded logic (e.g., ASICS). In exemplary embodiments, units of operative units 104 may comprise both computer-implemented instructions executed by a controller and hardcoded logic. Where operative units 104 are implemented in part in software, operative units 104 may include units/modules of code configured to provide one or more functionalities.

In exemplary embodiments, navigation units 106 may include systems and methods that may computationally construct and update a map of an environment, localize robot 102 (e.g., find the robot's position) in a map, and navigate robot 102 to/from destinations. The mapping may be performed by imposing data obtained in part by sensor units 114 into a computer-readable map representative at least in part of the environment. In exemplary embodiments, a map of an environment may be uploaded to robot 102 through user-interface units 112, uploaded wirelessly or through wired connection, or taught to robot 102 by a user.

In exemplary embodiments, navigation units 106 may include components and/or software configured to provide directional instructions for robot 102 to navigate. Navigation units 106 may process maps, routes, and localization information generated by mapping and localization units, data from sensor units 114, and/or other operative units 104.

Still referring to FIG. 1A, actuator units 108 may include actuators such as electric motors, gas motors, driven-magnet systems, solenoid/ratchet systems, piezoelectric systems (e.g., inchworm motors), magnetostrictive elements, gesticulation, and/or any way of driving an actuator known in the art. By way of illustration, such actuators may actuate the wheels for robot 102 to navigate a route; navigate around obstacles; rotate cameras and sensors. According to exemplary embodiments, actuator unit 108 may include systems that allow movement of robot 102, such as motorized propulsion. For example, motorized propulsion may move robot 102 in a forward or backward direction, and/or be used at least in part in turning robot 102 (e.g., left, right, and/or any other direction). By way of illustration, actuator unit 108 may control if robot 102 is moving or is stopped and/or allow robot 102 to navigate from one location to another location.

Actuator unit 108 may also include any system used for actuating, in some cases actuating task units to perform tasks. For example, actuator unit 108 may include driven-magnet systems, motors/engines (e.g., electric motors, combustion engines, steam engines, and/or any type of motor/engine known in the art), solenoid/ratchet system, piezoelectric system (e.g., an inchworm motor), magnetostrictive elements, gesticulation, and/or any actuator known in the art.

According to exemplary embodiments, sensor units 114 may comprise systems and/or methods that may detect characteristics within and/or around robot 102. Sensor units 114 may comprise a plurality and/or a combination of sensors. Sensor units 114 may include sensors that are internal to robot 102 or external, and/or have components that are partially internal and/or partially external. In some cases, sensor units 114 may include one or more exteroceptive sensors, such as sonars, light detection and ranging ("LiDAR") sensors, radars, lasers, cameras (including video cameras (e.g., red-blue-green ("RBG") cameras), infrared cameras, three-dimensional ("3D") cameras, thermal cameras, etc.), time of flight ("ToF") cameras, structured light cameras, antennas, motion detectors, microphones, and/or any other sensor known in the art. According to some exemplary embodiments, sensor units 114 may collect raw measurements (e.g., currents, voltages, resistances, gate logic, etc.) and/or transformed measurements (e.g., distances, angles, detected points in obstacles, etc.). In some cases, measurements may be aggregated and/or summarized. Sensor units 114 may generate data based at least in part on distance or height measurements. Such data may be stored in data structures, such as matrices, arrays, queues, lists, arrays, stacks, bags, etc.

According to exemplary embodiments, sensor units 114 may include sensors that may measure internal characteristics of robot 102. For example, sensor units 114 may measure temperature, power levels, statuses, and/or any characteristic of robot 102. In some cases, sensor units 114 may be configured to determine the odometry of robot 102. For example, sensor units 114 may include proprioceptive sensors, which may comprise sensors such as accelerometers, inertial measurement units ("IMU"), odometers, gyroscopes, speedometers, cameras (e.g. using visual odometry), clock/timer, and the like. Odometry may facilitate autonomous navigation and/or autonomous actions of robot 102. This odometry may include robot 102's position (e.g., where position may include robot's location, displacement and/or orientation, and may sometimes be interchangeable with the term pose as used herein) relative to the initial location. Such data may be stored in data structures, such as matrices, arrays, queues, lists, arrays, stacks, bags, etc. According to exemplary embodiments, the data structure of the sensor data may be called an image.

According to exemplary embodiments, sensor units 114 may be in part external to the robot 102 and coupled to communications units 116. For example, a security camera within an environment of a robot 102 may provide a controller 118 of the robot 102 with a video feed via wired or wireless communication channel(s). In some instances, sensor units 114 may include sensors configured to detect a presence of an object at a location such as, for example without limitation, a pressure or motion sensor may be disposed at a shopping cart storage location of a grocery store, wherein the controller 118 of the robot 102 may utilize data from the pressure or motion sensor to determine if the robot 102 should retrieve more shopping carts for customers.

According to exemplary embodiments, user-interface units 112 may be configured to enable a user to interact with robot 102. For example, user-interface units 112 may include touch panels, buttons, keypads/keyboards, ports (e.g., universal serial bus ("USB")), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory-card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. Users may interact through voice commands or gestures. User interface units 218 may include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. According to exemplary embodiments user interface units 112 may be positioned on the body of robot 102. According to exemplary embodiments, user interface units 112 may be positioned away from the body of robot 102 but may be communicatively coupled to robot 102 (e.g., via communication units including transmitters, receivers, and/or transceivers) directly or indirectly (e.g., through a network, server, and/or a cloud). According to exemplary embodiments, user-interface units 112 may include one or more projections of images on a surface (e.g., the floor) proximally located to the robot, e.g., to provide information to the occupant or to people around the robot. The information could be the direction of future movement of the robot, such as an indication of moving forward, left, right, back, at an angle, and/or any other direction. In some cases, such information may utilize arrows, colors, symbols, etc.

According to exemplary embodiments, communications unit 116 may include one or more receivers, transmitters, and/or transceivers. Communications unit 116 may be configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3GPP/3GPP2), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long-term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

Communications unit 116 may also be configured to send/receive signals utilizing a transmission protocol over wired connections, such as any cable that has a signal line and ground. For example, such cables may include Ethernet cables, coaxial cables, Universal Serial Bus ("USB"), FireWire, and/or any connection known in the art. Such protocols may be used by communications unit 116 to communicate to external systems, such as computers, smart phones, tablets, data-capture systems, mobile-telecommunications networks, clouds, servers, or the like. Communications unit 116 may be configured to send and receive signals comprising numbers, letters, alphanumeric characters, and/or symbols. In some cases, signals may be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communications unit 116 may be configured to send and receive statuses, commands, and other data/information. For example, communications unit 116 may communicate with a user operator to allow the user to control robot 102. Communications unit 116 may communicate with a server/network (e.g., a network) in order to allow robot 102 to send data, statuses, commands, and other communications to the server. The server may also be communicatively coupled to computer(s) and/or device(s) that may be used to monitor and/or control robot 102 remotely. Communications unit 116 may also receive updates (e.g., firmware or data updates), data, statuses, commands, and other communications from a server for robot 102.

In exemplary embodiments, operating system 110 may be configured to manage memory 120, controller 118, power supply 122, modules in operative units 104, and/or any software, hardware, and/or features of robot 102. For example, and without limitation, operating system 110 may include device drivers to manage hardware recourses for robot 102.

In exemplary embodiments, power supply 122 may include one or more batteries, including, without limitation, lithium, lithium ion, nickel-cadmium, nickel-metal hydride, nickel-hydrogen, carbon-zinc, silver-oxide, zinc-carbon, zinc-air, mercury oxide, alkaline, or any other type of battery known in the art. Certain batteries may be rechargeable, such as wirelessly (e.g., by resonant circuit and/or a resonant tank circuit) and/or plugging into an external power source. Power supply 122 may also be any supplier of energy, including wall sockets and electronic devices that convert solar, wind, water, nuclear, hydrogen, gasoline, natural gas, fossil fuels, mechanical energy, steam, and/or any power source into electricity.

One or more of the units described with respect to FIG. 1A (including memory 120, controller 118, sensor units 114, user-interface unit 112, actuator unit 108, communications unit 116, mapping and localization unit 126, and/or other units) may be integrated onto robot 102, such as in an integrated system. However, according to some exemplary embodiments, one or more of these units may be part of an attachable module. This module may be attached to an existing apparatus to automate so that it behaves as a robot. Accordingly, the features described in this disclosure with reference to robot 102 may be instantiated in a module that may be attached to an existing apparatus and/or integrated onto robot 102 in an integrated system. Moreover, in some cases, a person having ordinary skill in the art would appreciate from the contents of this disclosure that at least a portion of the features described in this disclosure may also be run remotely, such as in a cloud, network, and/or server.

As used herein, a robot 102, a controller 118, or any other controller, processor, or robot performing a task, operation or transformation illustrated in the figures below comprises a controller executing computer-readable instructions stored on a non-transitory computer-readable storage apparatus, such as memory 120, as would be appreciated by one skilled in the art.

Next referring to FIG. 1B, the architecture of a processor 138 is illustrated according to an exemplary embodiment. As illustrated in FIG. 1B, the processing device 138 includes a data bus 128, a receiver 126, a transmitter 134, at least one processor 130, and a memory 132. The receiver 126, the processor 130 and the transmitter 134 all communicate with each other via the data bus 128. The processor 130 is configurable to access the memory 132, which stores computer code or computer-readable instructions in order for the processor 130 to execute the specialized algorithms. As illustrated in FIG. 1B, memory 132 may comprise some, none, different, or all of the features of memory 120 previously illustrated in FIG. 1A. The algorithms executed by the processor 130 are discussed in further detail below. The receiver 126 as shown in FIG. 1B is configurable to receive input signals 124. The input signals 124 may comprise signals from a plurality of operative units 104 illustrated in FIG. 1A including, but not limited to, sensor data from sensor units 114, user inputs, motor feedback, external communication signals (e.g., from a remote server), and/or any other signal from an operative unit 104 requiring further processing. The receiver 126 communicates these received signals to the processor 130 via the data bus 128. As one skilled in the art would appreciate, the data bus 128 is the means of communication between the different components—receiver, processor, and transmitter—in the processor. The processor 130 executes the algorithms, as discussed below, by accessing specialized computer-readable instructions from the memory 132. Further detailed description as to the processor 130 executing the specialized algorithms in receiving, processing and transmitting of these signals is discussed above with respect to FIG. 1A. The memory 132 is a storage medium for storing computer code or instructions. The storage medium may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage medium may include volatile, nonvolatile, dynamic, static, read/write, read-only, random-access, sequential-access, location-addressable, file-addressable, and/or content-addressable devices. The processor 130 may communicate output signals to transmitter 134 via data bus 128 as illustrated. The transmitter 134 may be configurable to further communicate the output signals to a plurality of operative units 104 illustrated by signal output 136.

One of ordinary skill in the art would appreciate that the architecture illustrated in FIG. 1B may also illustrate an external server architecture configurable to effectuate the control of a robotic apparatus from a remote location. That is, the external server may also include a data bus, a receiver, a transmitter, a processor, and a memory that stores specialized computer-readable instructions thereon.

One of ordinary skill in the art would appreciate that a controller 118 of a robot 102 may include one or more processing device 138 and may further include other peripheral devices used for processing information, such as ASICS, DPS, proportional-integral-derivative ("PID") controllers, hardware accelerators (e.g., encryption/decryption hardware), and/or other peripherals (e.g., analog to digital converters) described above in FIG. 1A. The other peripheral devices when instantiated in hardware are commonly used within the art to accelerate specific tasks (e.g., multiplication, encryption, etc.) which may alternatively be performed using the system architecture of FIG. 1B. In some instances, peripheral devices are used as a means for intercommunication between the controller 118 and operative units 104 (e.g., digital to analog converters and/or amplifiers for producing actuator signals). Accordingly, as used herein, the controller 118 executing computer-readable instructions to perform a function may include one or more processing device 138 thereof executing computer-readable instructions and, in some instances, the use of any hardware peripherals known within the art. Controller 118 may be illustrative of various processing devices 138 and peripherals integrated into a single circuit die or distributed to various locations of the robot 102 which receive, process, and output information to/from operative units 104 of the robot 102 to effectuate control of the robot 102 in accordance with instructions stored in a memory 120, 132. For example, controller 118 may include a plurality of processing devices 138 for performing high-level tasks (e.g., planning a route to avoid obstacles) and processing devices 138 for performing low-level tasks (e.g., producing actuator signals in accordance with the route).

Figure 2:
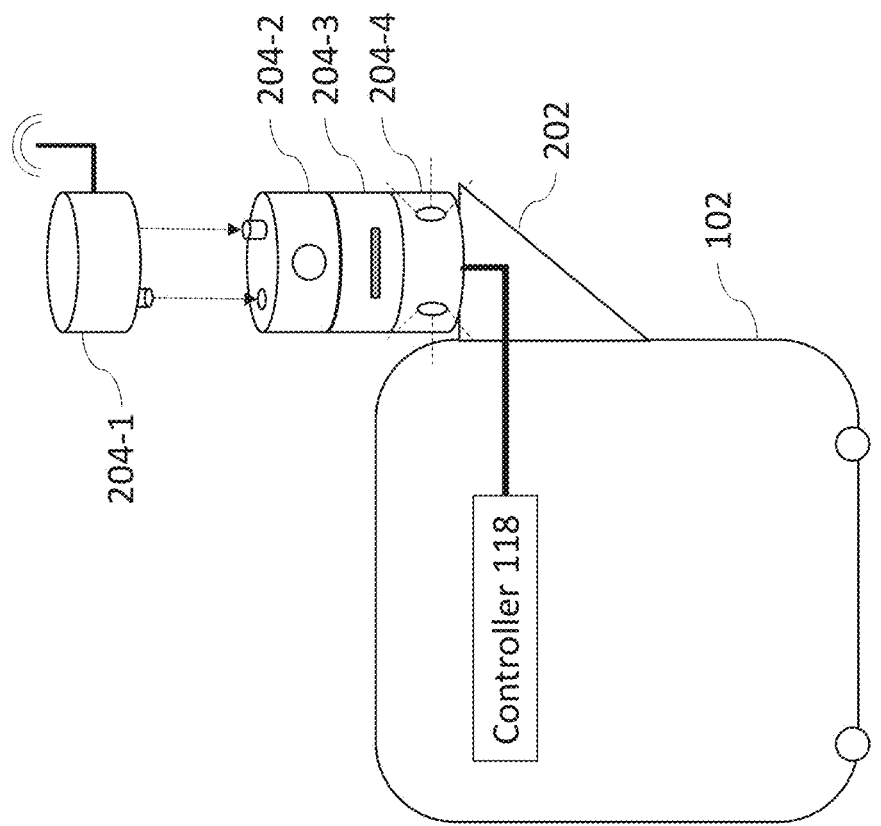
FIG. 2 illustrates a robot comprising various modules coupled thereto, according to an exemplary embodiment.

FIG. 2 illustrates a robot 102 utilizing a plurality of modules 204, according to an exemplary embodiment. The modules may include sensory modules such as, for example, a Wi-Fi or cellular network strength analyzer, a depth camera, a scanning LiDAR, an RGB camera, IMUs, or any introspective or exteroceptive sensor (e.g., as described with respect to sensor units 114 in FIG. 1A). The modules may further include utility modules configured to enhance or provide additional utility to the robot 102 and/or nearby humans. Such utility modules may include, for example, light sources, additional processing devices 138, non-transitory computer-readable memories, Wi-Fi or cellular hotspots, audio speakers, and/or any other form of utility, either to a robot 102 (e.g., more memory space) or humans (e.g., mobile Wi-Fi), configurable by a controller 118 of a robot 102.

By way of illustration, module 204-1 may include a local Wi-Fi hot-spot utility module, module 204-2 may include one or more cameras, module 204-3 may include a LiDAR sensor, and module 204-4 may include light sources (e.g., ultraviolet lights for disinfection or for illumination of a visual scene for the camera of module 204-2), however it is appreciated that the modules 204 are not limited to these embodiments. As illustrated, the various modules 204-1, 204-2, 204-3 are stacked up in a vertical fashion with respect to each other. However, one skilled in the art would appreciate this orientation to be non-limiting purposes.

The plurality of modules 204 may be coupled to the robot 102 using a connection interface 202 of module 204-4. The connection interface 202 may comprise at least one data channel that communicates data to and from the controller 118 of the robot 102 to the various modules 204. The at least one data channel may utilize one or more multiplexing methods (e.g., FDM, OFDM, etc.) or may be memory mapped to a bus to enable the controller 118 to effectuate control of each module 204 individually. The data channel may include one or more physical wires or connectors (e.g., Cat5, coaxial cable, USB ports, etc.). That is, each of the modules 204 may be slave devices to the controller 118.

According to at least one non-limiting exemplary embodiment, the connection interface 202 is wireless, wherein one or more of the modules may communicate and receive data to and from the controller 118 using a wireless communication channel with communication units 116 of a robot 102. Wireless communication, however, may introduce additional latency between data acquisition by a sensory module 204 and reading/processing of the data by the controller 118. A wireless connection interface 202 may still include mechanical means for attaching the modules 204 to the robot 102 body.

According to at least one non-limiting exemplary embodiment, the modules 204 may each couple to the connection interface 202 of the robot 102, wherein the connection interface 202 may include multiple physical/hardware or wireless communication means that couple controller 118 with the various modules 204. That is, modules 204 are not intended to be limited to being coupled to each other as illustrated and may be directly coupled to the robot 102 and controller 118 thereof. For example, the modules 204 may include exteroceptive sensors such as LiDAR, depth cameras, RGB cameras, etc., wherein the sensory modules 204 may be coupled to the robot 102 at various locations using respective connection interfaces 202. Although the present disclosure discusses modules 204 as being coupled to each other, wherein one module 204 is coupled via connection interface 202 to the controller 118, it is appreciated that the connection interface 202 may be illustrative of two or more electronic and mechanical connection interfaces located in one or more positions on the robot 102.

Figure 3:
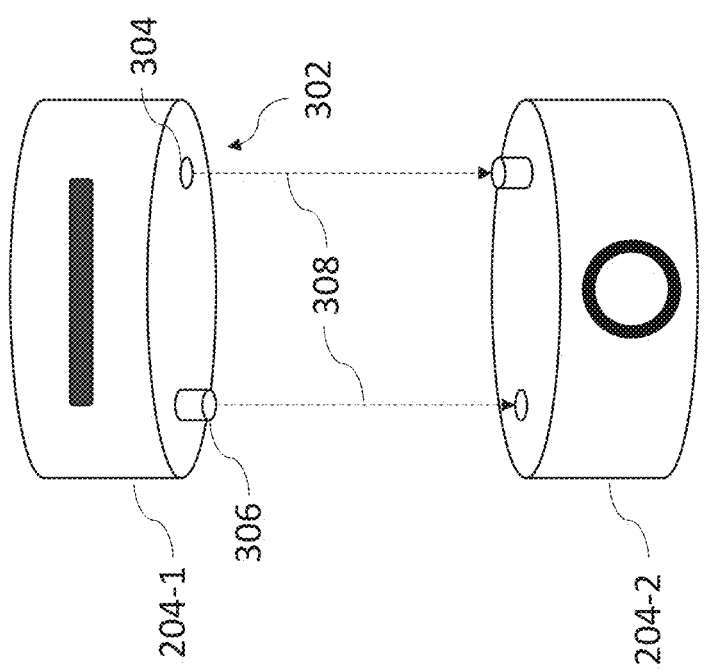
FIG. 3 illustrates two modules and a means for coupling the two modules together, according to an exemplary embodiment.

FIG. 3 illustrates an exemplary embodiment of a connection interface 302 of two modules 204-1 and 204-2, according to an exemplary embodiment. Connection interface 302 of a module 204 may include input channel 304 and a respective output channel 306. As shown in the figure, the input channel 304 and output channel 306 are physically separated, however this is not intended to be limiting (e.g., both input and output channels may be embodied on a single coaxial cable, a single memory-mapped bus, a USB connection interface, lightning ports, etc.). Arrows 308 illustrate how the connection interfaces 302 couple to each other according to the depicted embodiment, however other connection interfaces are considered as shown and described in FIG. 7A-B below. In some embodiments, the top surface of module 204-1 and the bottom surface of the modules 204-2 (obscured from view) may additionally comprise connection interfaces 302 substantially similar to the ones depicted. It is further appreciated that connection interface 302 is substantially similar to connection interface 202 of a robot 102 to enable coupling of the connection interface 302 of a module 204 to the connection interface 202 of the robot 102.

By way of illustration, the module 204-2 may include an output channel 306 and an input channel 304 located on a bottom surface of the module 204-2 which is obscured from view in the illustration. The respective input and output channels 304, 306 may couple to the connection interface 202 of a robot 102 that includes reciprocal connectors such that a controller 118 of the robot 102 may effectuate control of the module 204-2. If so desired by an operator of the robot 102, module 204-1 may be coupled to the module 204-2 via coupling respective input and output channels 304, 306 of the two modules (e.g., following the illustrated arrows 308). Alternatively, the connection interface 202 of the robot 102 may include a separate pair of input/output connectors that enable the module 204-1 to couple to the robot 102 on a different portion of the robot body or chassis.

According to at least one non-limiting exemplary embodiment, the connection interface 302 may further comprise connectors, latches, pins, magnets, or other (electro)mechanical attachment means for securing the two modules 204 together and ensuring the connections between respective channels 304, 306 are preserved despite, for example, perturbations experienced as a robot 102 navigates over bumps or uneven floors.

Figure 4:
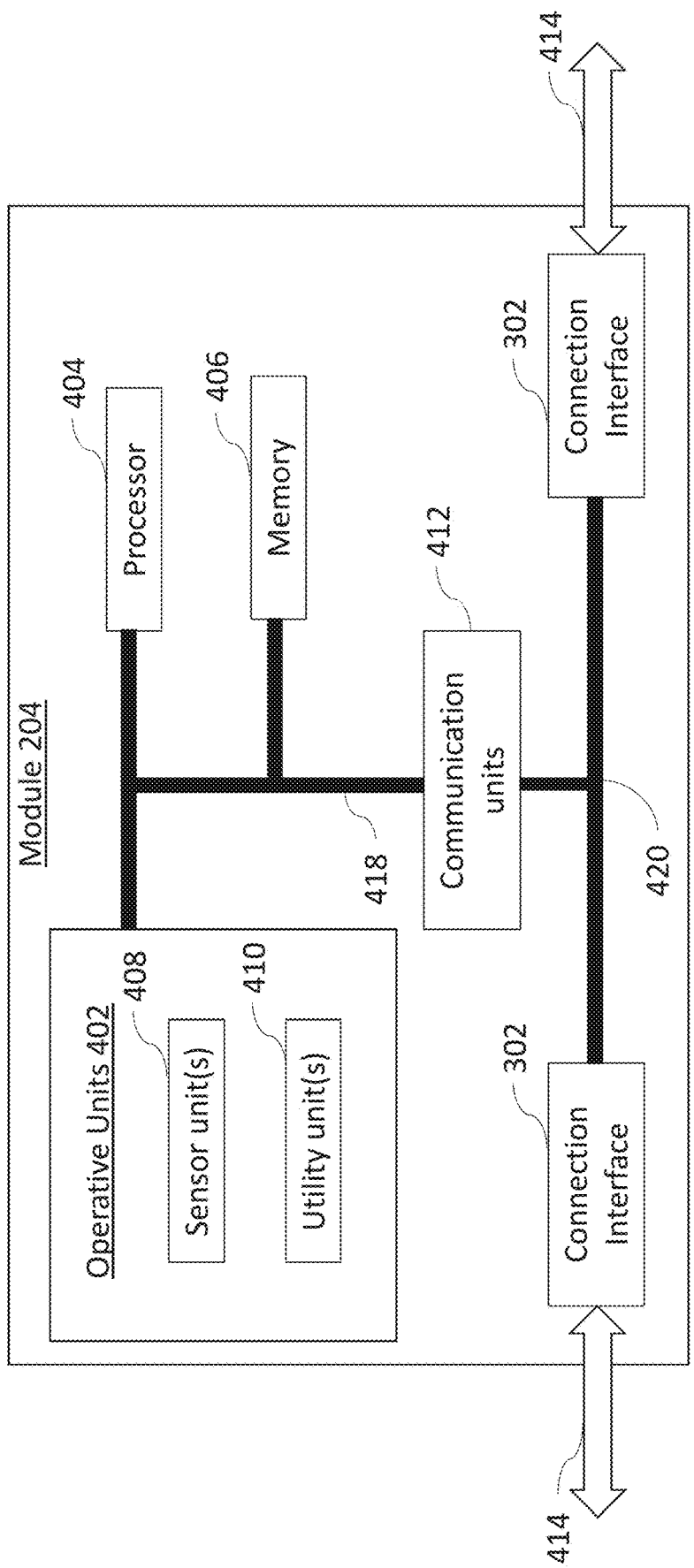
FIG. 4 is a functional block diagram of a module in accordance with some embodiments of this disclosure.

FIG. 4 is a functional block diagram illustrating various components of a module 204, in accordance with some exemplary embodiments of this disclosure. Module 204 may comprise a processor 404 and a non-transitory computer-readable memory 406. Processor 404 and memory 406 may be substantially similar to processing devices 138 depicted in FIG. 1B. That is, the processor 404 may be coupled to a bus, a transmitter, and/or a receiver, which have been omitted for clarity and execute computer-readable instructions from the memory 406 to perform the functions of the module 204. The processor 404 may communicate with one or more operative units 402 of the module 204 using connections 418, which may include a bus, wireless communication channel (e.g., including transceivers), or one or more wired connections.

The processor 404 may further utilize communications units 412 to send and receive signals from a controller 118 of a robot 102 when the connection interface 302 of the module 214 is coupled to a connection interface 202 of the robot 102. Communications units 412 may be illustrative of hardware or software elements that enable the communications between the processor 404 and the controller 118. For example, communications units 412 may include, but are not limited to, A/D converters, D/A converters, systems that operate a memory-mapped bus (e.g., 420), systems that implement a communications protocol (e.g., USB protocol, network-time protocol ("NTP"), $I^2C$ protocols, etc.), encryption/decryption firmware, encoding/decoding firmware, multiplexers (e.g., hardware multiplexers, frequency multiplexers, etc.), tri-state buffers, buffer registers, digital signal processors ("DSP"), synchronizers, clocks, and/or other circuitry that enables communication between a processor 404 of a module 204 and a controller 118 of a robot 102. The communications units 412 may interface the processor 404 with a bus 420, wherein the bus 420 carries signals to/from the module 204 via the connection interfaces 302 to/from a controller 118 of a robot 102. The signals from bus 420 are communicated via channels 414, wherein channels 414 may illustrate input and output channels for the module 204 (e.g., channels 304, 306 of FIG. 3 or channels 608, 606, 614 of FIG. 6).

According to at least one non-limiting exemplary embodiment, a module 204 may comprise no processor and/or memory 406 and may be controlled entirely by signals communicated from a controller 118 of a robot 102. The signals are transmitted via connection interface 302 and bus 420 from the controller 118 of the robot 102. For example, the module 204 may be simply a light source that receives power from power supply 122 of a robot 102 and/or an ON/OFF signal from controller 118.

Operative units 402 comprise various components that effectuate the utility of the module 204. In some embodiments, operative units 402 may include one or more sensor units 408. These sensor units 408 may include, without limitation, LiDAR sensors, depth-imaging sensors, RGB cameras, a binocular pair of cameras (e.g., for distance estimation), MEMS/NEMS devices, gyroscopes, magnetometers, Wi-Fi or cellular spectrum analyzers, temperature sensors, and/or any other sensors described with respect to sensor units 114 of FIG. 1A. That is, sensor units 408 may include any exteroceptive sensor configured to enable a robot 102 to sense or perceive its surrounding environment and/or introspective sensor configured to measure characteristics of the robot 102 (e.g., position, speed, etc.).

Utility units 410 may include one or more devices configured to enhance utility of a robot 102. Enhancing utility may comprise enhancing performance of a robot 102 with respect to one or more tasks or providing a service that the robot 102, absent the module 204, is unable to provide (e.g., providing a local Wi-Fi hotspot). Utility units 410 may include, without limitation, Wi-Fi hot-spots, cellular hot-spots, external lights (e.g., broadband visual, infrared, or other frequency light), hardware accelerators (e.g., encryption or encoding prefinals), user interfaces, communication devices (e.g., described with respect to communications units 116 in FIG. 1A such as additional antennae), audio speakers, power supplies, one or more additional processing devices 138, and/or one or more additional non-transitory memories. Utility units 410 may further include devices for executing tasks such as, for example, robotic arms, vacuums, ultraviolet disinfecting lights, floor-scrubbing systems (e.g., including scrubbing brushes, mops, and/or drying pads), candy dispensers, and the like which may further include actuators (e.g., as described with respect to actuator units 108 in FIG. 1A) and/or sensors (e.g., 408).

Data collected or processed by the various operative units 402 may be communicated to the processor 404 (e.g., for further processing), wherein the processor 404 may utilize the communications units 412 to provide the collected data to a controller 118 of the robot 102.

Channel 420 may be illustrative of a memory-mapped bus, one or more wired connections, a wireless communication channel, or other similar means of communicating data between connection interfaces 302. The channel 420 being coupled via connection interfaces 302 to a controller 118 of a robot 102 when the module 204 is coupled to the robot 102. Connection interfaces 302 comprise data connectors (e.g., USB, Cat5, coaxial, or other connector) and, in some instances, mechanical connectors (e.g., latches, pins, clamps, Velcro®, and so forth). Connection interfaces 302 may be functional blocks illustrative of connection interfaces 302 of FIG. 3 and/or 202 of FIG. 7A-B. Communications 414 may communicatively couple the module 204 to either (i) another module 204, or (ii) a controller 118 of a robot 102. In some embodiments, connection interface 302 may comprise a plurality of connectors, wherein only one or more are utilized (e.g., a connection interface 404 may comprise Cat5, USB, and a micro-USB connector and may connect to a second module 204 comprising only a reciprocal micro-USB connector).

According to at least one non-limiting exemplary embodiment, a module 204 may further comprise a power supply. The power supply may comprise, without limitation, a lithium ion battery, nickel-metal hydride batteries, solar panels, hydrogen fuel cells, alkaline batteries, or any other form of battery or power supply known in the art. According to at least one non-limiting exemplary embodiment, power may be supplied to a module 204 from power supply 122 of a robot 102.

It is appreciated that each module 204 comprises a compatible connection interface 302 with all other connection interfaces 302 of other modules 204 and to robot 102 to enable connection of two or more of these modules 204, wherein each of the two or more modules 204 may be designed by different manufacturers or used by different robots 102 for different purposes. Standardization of each connection interface 302 is advantageous in that any module 204, be that a LiDAR, camera, or Wi-Fi hot-spot, may be coupled to a robot 102 to enhance functionality and utility of the robot 102 without limitation and without substantial modification to the robot 102 itself.

According to at least one non-limiting exemplary embodiment, the connection interface 202 may be an attachable module configured to attach to a certain make or model of robot 102 to enable the robot 102 to receive modules 204. For example, the connection interface 202 may be designed for a specific body type or shape of a model of robot 102 such that connection interfaces 302 of the modules 204 may be standardized. An operator of the robot 102 may be required to utilize additional screws, bolts, latches, or other mechanical means for attaching the connection interface 202 to the robot 102. In some instances, the connection interface 202 may be implemented on a robot 102 by replacement of a portion of the robot 102 (e.g., replacing a panel with the connection interface). One or more wires or cables may be utilized to couple the connection interface 202 to controller 118 of the robot 102.

Figure 5A:
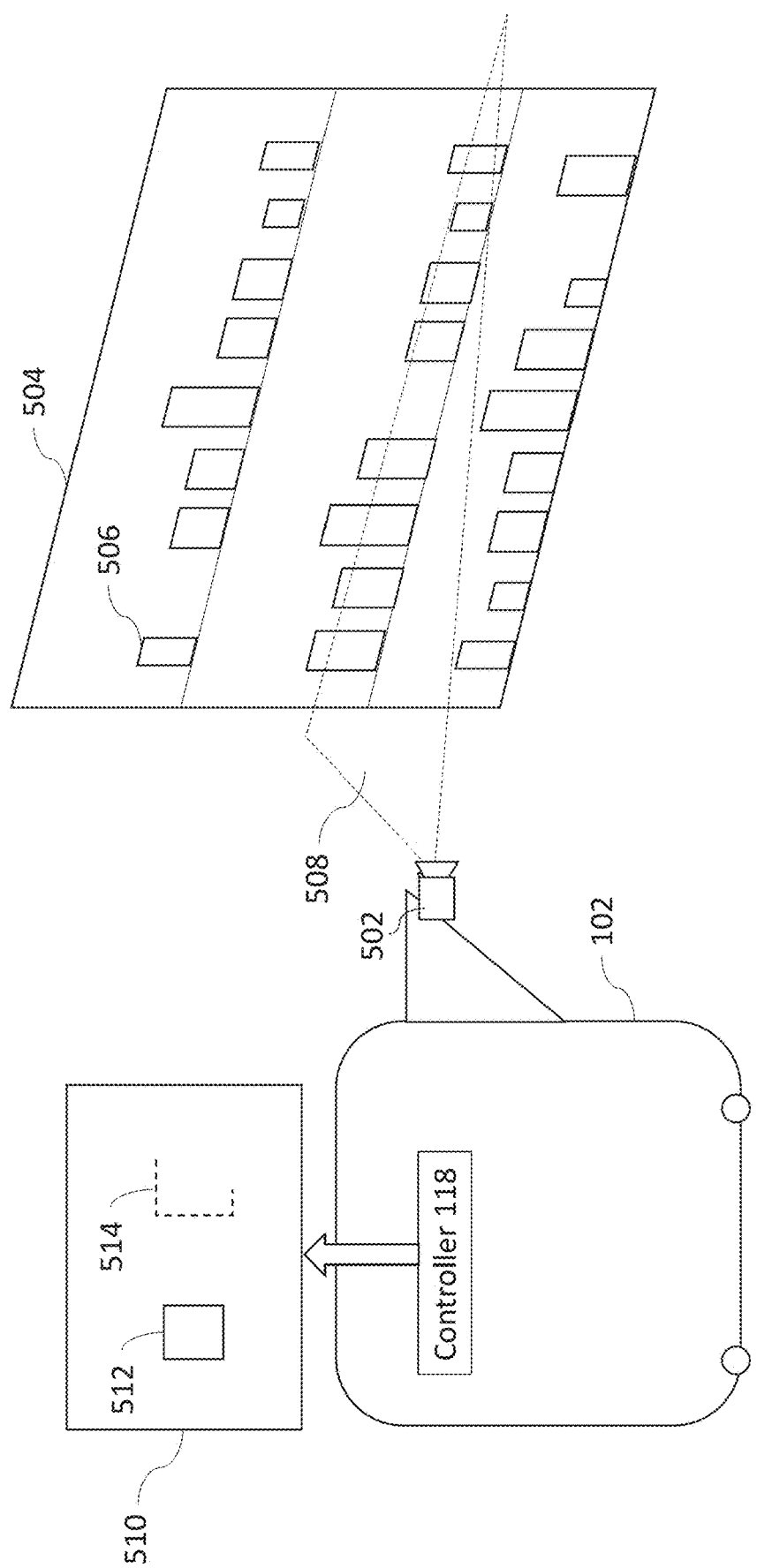
FIG. 5A illustrates a robot comprising no modules generating a computer-readable map, according to an exemplary embodiment.

FIG. 5A illustrates a robot 102 utilizing only sensor units 114 to navigate and map its environment, according to an exemplary embodiment. Sensor units 114 may include, in part, a scanning LiDAR 502. Scanning LiDAR 502 may utilize a time of flight of a laser beam to measure distance to targets, wherein the laser beam is swept across a field of view 508 of the LiDAR 502. In the illustrated embodiment, the LiDAR 502 is sensing a shelf 504. Shelf 504 may comprise various features 506, such as items on the shelf. Distance information collected by the sensor 502 may be utilized by a controller 118 to generate a computer-readable map 510, wherein the map 510 may include locations of object 504 shown by contour line 514 (representing the shape of object 504). LiDAR sensor 502 may be utilized to satisfy a bare minimum requirement for safe navigation of the robot 102 through its environment (e.g., detect and avoid obstacles) and to enable the robot 102 to perform its basic functions. Manufacturers of robots 102 may not desire to configure additional sensor units 114 on the robot 102 beyond what is required to enable the robot 102 to perform its basic functions because the additional sensors may increase cost of the robot 102 to consumers and the additional sensors may not be of substantial utility to all the consumers for the increase in cost to be acceptable.

Computer-readable map 510 may include a footprint 512 indicating a position of the robot 102. Additionally, the distance information collected by the LiDAR 502 may be plotted on the computer-readable map as shown by line 514. Line 514 may localize only a surface of the shelf 504, which is in view of the sensor 502. The presence of the object 504 plotted on the computer-readable map 510 may be of use for navigating the robot 102 safely, but otherwise produces no additional information such as features 506 of the object 504.

According to at least one non-limiting exemplary embodiment, sensor 502 may be an RGB camera, a depth camera, structured light sensor, or other sensor unit 114. One skilled in the art may appreciate how data collected by various sensor units 114 may be plotted onto the computer-readable map 510. For example, RGB images of the object 504 may be superimposed onto the map 510 to provide color data to localized objects.

According to at least one non-limiting exemplary embodiment, robot 102 may comprise one of a plurality of robots manufactured of a certain make or model. An owner or operator of the robot 102 may desire the robot 102 to collect additional information that the make or model of robot 102 is not presently configured to collect. For example, it may be desirable for the robot 102 to, in addition to its basic functions and localization of objects for navigation, collect additional information or provide additional utility and insight to the owner or operator, such as identifying features 506 of the object 504 (e.g., products on a store shelf).

Figure 5B:
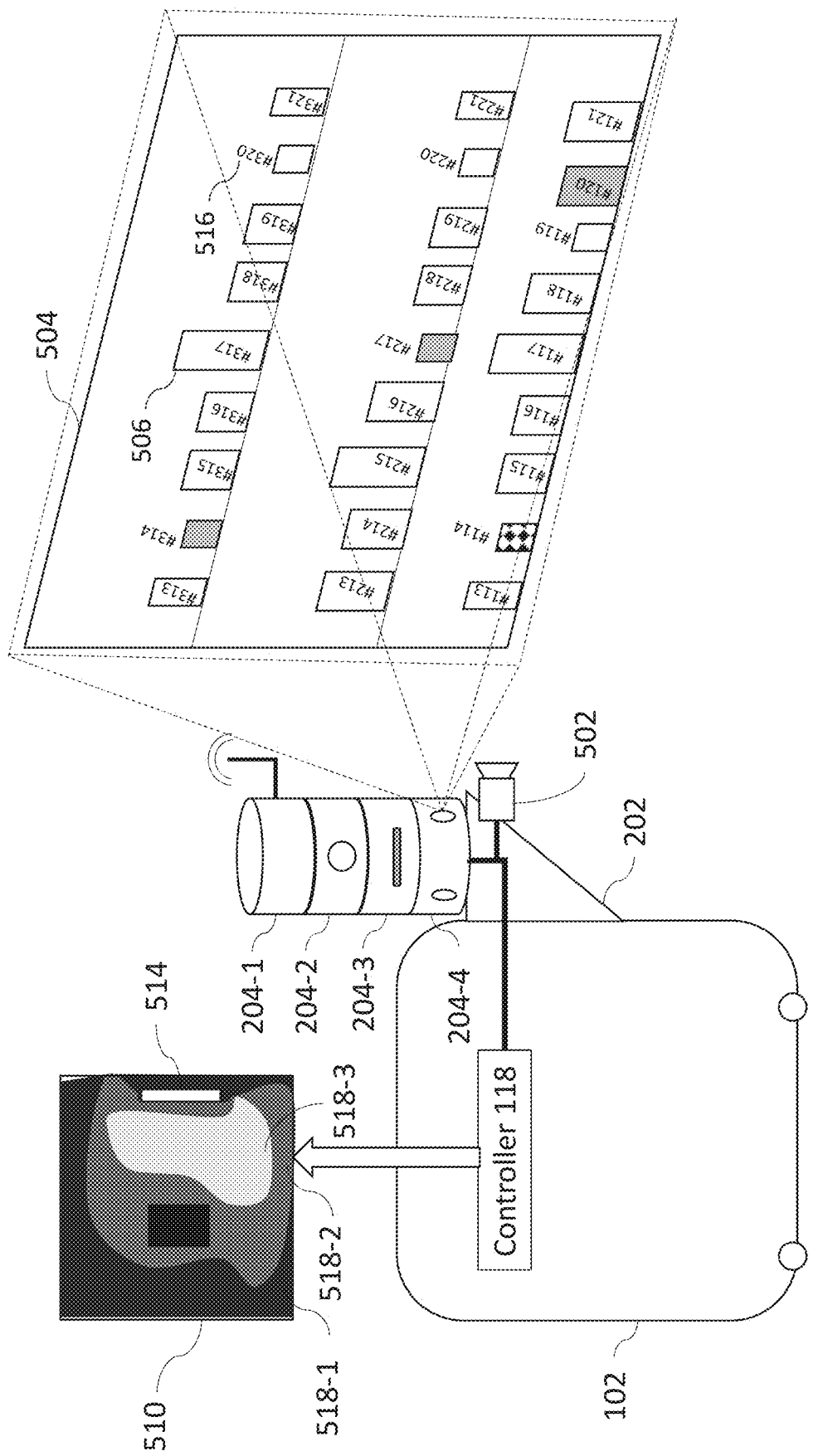
FIG. 5B illustrates a robot comprising at least one module generating a computer-readable map with enhanced detail, according to an exemplary embodiment.

FIG. 5B illustrates a robot 102 comprising four modules 204 configured to enhance utility and operability of the robot 102, according to an exemplary embodiment. From top to bottom: module 204-4 may comprise, for example, an RGB imaging camera; module 204-3 may comprise a feature recognition module configured to process RGB images and identify features therein; module 204-2 may comprise a depth camera; and module 204-1 may comprise a Wi-Fi signal strength analyzer, according to this non-limiting exemplary embodiment. It is appreciated, however, that the four modules 204 illustrated may be arranged in any order and/or may be replaced with different modules 204 for performing different functions. Each module 204 may be coupled to each other via their respective connection interfaces 302 (obscured from view), wherein module 204-4 couples to the connection interface 202 of the robot 102. As discussed above, the connection of module 204-4 to the connection interface 202 allows all modules 204-1, 204-2, 204-3 and 204-4 to communicate with the robot 102 and particularly to controller 118 of robot 102.

By way of illustrative example, the RGB camera module 204-4 may capture colorized images (e.g., RGB, HSV, YUV, or other color encoding formats) of a scene within its field of view. The camera module 204-4 may be configured to produce images with minimal blur such as, for example, by a processor 404 of the camera module 204-4 adjusting a focal length of the camera sensor 408. The images may be communicated to the image-processing module 204-3, wherein the image processing module 204-3 may utilize one or more processors 404 to embody a neural network or image-recognition model to identify one or more features within the images received. According to at least one non-limiting exemplary embodiment, the images may be first communicated from the camera module 204-4 to the controller 118 and subsequently the controller 118 may communicate the images to the processing module 204-3 using, for example, a memory-mapped bus. That is, modules 204-3 and 204-4 may or may not be in direct communication with each other. The image-processing module 204-3 may return labeled or annotated images to the controller 118, the annotated images comprising classifications for one or more pixels. The classifications may include, in this example, shelf-keeping unit ("SKU") numbers 516 that identify individual items in the image with a unique identifier number. Other classifications of features are considered, wherein the specific classification is not intended to be limited to SKU numbers 516 and may be application-specific. SKU numbers 516 may identify the items 506 on shelf 504 such as, for example, "cereal brand X," "lotion Y from brand Z," and so forth for stock-keeping of the store.

As the modules 204-3 and 204-4 work in tandem to collect images and process the images to identify SKU numbers 516 of objects 506 on shelf 504, other modules 204-1 and 204-2 may perform additional functions. For example, Wi-Fi signal strength analyzer module 204-1 may sense a signal strength (e.g., RSSI, SNR, etc.) of a local Wi-Fi network within the store. The data collected may be mapped onto a computer-readable map 510, as shown by regions 518. Region 518-1 may comprise weak signal strength, 518-2 may comprise medium signal strength, and region 518-3 may comprise a strong signal strength, for example. Other delineations of signal strength may be mapped onto a map 510 as appreciated by one skilled in the art. The size and shape of the regions 518 may depend on measurements collected by the module 204-1 and position data of the robot 102 during acquisition of the measurements, wherein the mapping may be performed by a controller 118 using data from module 204-1 and navigation units 106. Depth camera module 204-2 may be utilized to further enhance the accuracy of the computer-readable map 510 by providing additional localization data to the controller 118 during generation of the map 510 in addition to data from sensor 502.

Advantageously, the use of a connection interface 202 configured to couple the robot 102 to one or more modules 204 may enable owners of robots 102 to both enhance performance of their robots 102 by providing their controllers 118 with additional localization data (e.g., from a depth camera module 204-2) and/or more accurate localization data (e.g., using a module 204 comprising a LiDAR or camera of higher quality than a base make or model of the robot 102). Further, utility of the robots 102 may be enhanced for specific applications of which the operator may decide.

As shown by the example illustrated in FIG. 5B, a store owner may utilize, for example, a cleaning robot 102 to perform item identification by coupling one or more modules 204 to the connection interface 202 of the robot 102. In some instances, the modules 204 may require little to no additional computational resources from the controller 118 to perform their respective functions. For example, the depth-camera module 204-2 may collect depth images and measurements, produce a computer-readable map (via processor 404 executing instructions from memory 406), and communicate the computer-readable map to the controller 118, wherein the controller 118 may incorporate the mapped data onto the map 510. That is, modules 204 may in part process data from sensor units 114 and/or other modules 204 such that the controller 118 is not required to do so (i.e., utilizes fewer computational resources such as memory space, processor threads, time, etc.).

According to another non-limiting exemplary embodiment, cellular providers may desire to map their coverage within buildings comprising robots 102. For example, robots 102 may be configured to clean floors within airports or shopping malls, wherein it may be desirable for the cellular providers to map coverage within these environments. To achieve the mapping of cellular coverage, a module 204-1 may be attached to a connection interface 202 of the robot 102 and utilize position data of the robot 102, determined by navigation units 106 and sensor units 114, to produce a computer-readable map, similar to map 510 depicted in FIG. 5B. It is appreciated that the connection interface 202 used to couple the robot 102 to additional sensor or utility modules 204 may be of substantially lower cost than modifying internal components of the robot 102 to accommodate the additional utility. In some instances, it may not be possible to modify the internal components without risk of damaging the robot 102 and/or without adequate training. In some instances, the communication interface 202 may be illustrative of one or more USB, CAT-5, coaxial, or other data connector which is unused in typical operation (e.g., the connector may be utilized for manually updating software via physical connection) and a part of the make or model of robot 102. Accordingly, robot operators comprising no training and with no skill in the art may modify their robots 102 to enhance operations of their robots 102 using any one or more modules 204 of their choosing. In some instances, the communication interface 202 may comprise components to physically attach it and modules 204 to an existing robot 102. In other instances, a robot may be manufactured with a connection interface 202 integral to the body of the robot.

One can appreciate that modules 204 can be interchangeable or replaceable so that a robot owner can selectively enhance performance of the robot at different times depending on need. For example, a Wi-Fi signal strength module 204-1 may be used occasionally to map signal strength in a store initially or after substantial changes are made in the store, while a combination of an RGB camera module 204-4 and an image-processing module 204-3 may be used daily.

In some exemplary embodiments, a module 204 may comprise an integral connection interface 202 in a unitary module attachable to a robot 102.

Figure 6:
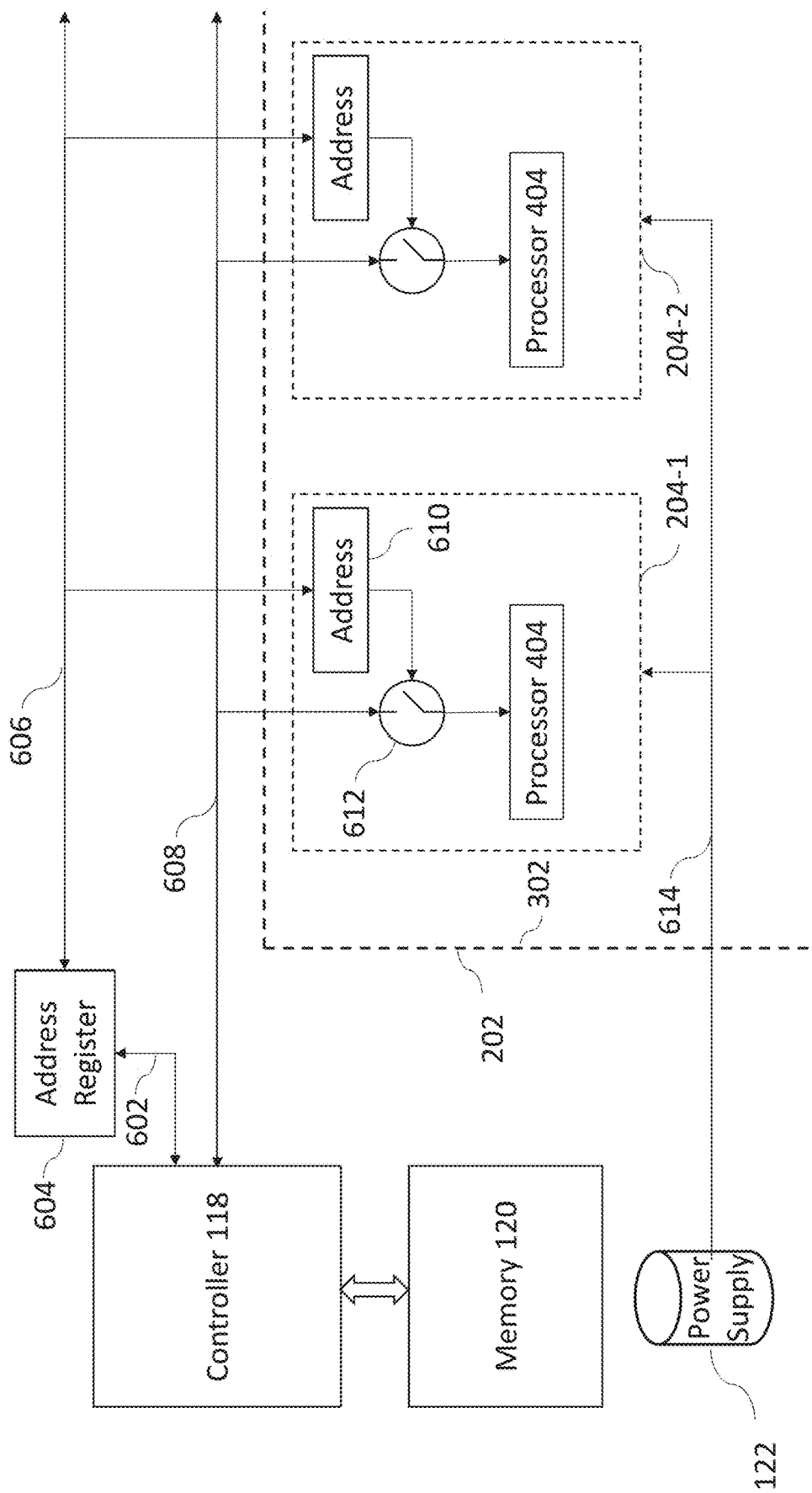
FIG. 6 is a functional block diagram illustrating a memory-mapped system for coupling modules to a robot, according to an exemplary embodiment.

FIG. 6 is a functional block diagram illustrating a system for implementing a connection interface 202 for use in coupling at least one module 204 to a controller 118 of a robot 102 using a memory-mapped interface, according to an exemplary embodiment. The connection interface 202 of the robot 102 is illustrated by a dashed line. The connection interface 302 of the two modules 204 is also illustrated with the same dashed line to denote the coupling of the connection interface 302 of the modules 204 to the connection interface 202 of the robot 102. To effectuate data transmission or receipt from a module 204, the controller 118 may specify an address of the respective module 204 to an address register 604 via communications 602 (e.g., wired or wireless communication). The address register 604 may comprise any length of word or binary value(s) that specifies which module the controller 118 is to communicate with. For example, module 204-1 may comprise an address, stored in address register 604, of 0001, module 204-2 may store an address of 0002, and so forth. In some embodiments, the address register 604 may correspond to a register of controller 118, wherein the address register 604 is illustrated as a separate functional block for clarity.

According to at least one non-limiting exemplary embodiment, the addresses in the registers 610 of each respective module 204 may be set in the address register 604 by the controller 118 upon their detection of attachment to (i) the connection interface 202, or to (ii) a module 204 which is already coupled to the controller 118. For example, the address may be configured as part of an initialization procedure.

According to at least one non-limiting exemplary embodiment, the addresses stored in the address register 604 of each module 204 may be predetermined. For example, a LiDAR module 204 may comprise an address 0001, a depth camera module 204 may comprise an address 0002, and so forth.

To communicate data to/from each respective module 204, the controller 118 may specify an address of the desired one of the modules 204 coupled thereto. The address is then compared with the address stored in address register 604 of each respective module 204, as shown by comparison block 612. The specified address from the address register 604 may be communicated via a communications channel 606 such that the specified address may be compared with addresses 610 of the modules 204. The channel 606 may comprise the same or a different communications channel from channel 608 (e.g., using a same or different wire, cable, etc.). If the address specified by the controller 118 matches the address stored in the register 610, then data channel 608 between the controller 118 and specified module 204 is opened. The data channel 608 may comprise a bi-directional data channel, bus, or two unidirectional data channels. The data channel 608 may be a wired or wireless communication channel. One skilled in the art may appreciate that additional circuit components may be utilized to effectuate proper communication using a bi-directional bus, such as tri-state buffers, synchronizers, and the like, which have been omitted for clarity. Upon opening the channel 608, the controller 118 may either read data on the data channel 608 produced by a processor 404 of a specified module 204 or may send data on the data channel 608 to the processor 404 of the specified module 204.

According to at least one non-limiting exemplary embodiment, data channels 606 and 608 may comprise a single wired connection. To specify addresses of modules 204 from which the controller 118 may desire to send/receive data, a timing protocol may be followed. Various timing protocols are known within the art that may effectuate the communication and any applicable timing protocol may be utilized without limitation. Proprietary timing protocols may be utilized without detracting from the inventive concept of this disclosure. For example, the controller 118 may first output an address value, a read or write bit, followed by either a fixed length transmission of data to be communicated to a module 204 or a fixed length message received from the specified module 204 and subsequently repeat the cycle.

According to at least one non-limiting exemplary embodiment, the power supply 122 of the robot 102 may supply power to none, one, some, or all the modules 204 using a connection 614. Connection 614 may be embodied within the same connector (e.g., a USB) as channels 606, 608 or may be a separate wired connection. Some modules 204 may comprise internal power supplies, such as batteries. Some modules 204 may comprise batteries for use in powering a robot 102 for longer periods of time (i.e., provide power to the power supply 122) and/or power other modules 204. The connection 614 may further include additional circuitry elements such as voltage regulators, rectifiers, amplifiers, and the like, which have been omitted for clarity.

According to at least one non-limiting exemplary embodiment, the channel 608 may be further configurable to support interrupt requests. The interrupts may be sent by the controller 118 to a module 204 or by a processor 404 of a module 204 to the controller 118. For example, a module 204 may be configured to identify objects within images captured by sensor units 114 of the robot 102 or by a sensor unit 408 of a different module 204, wherein the interrupt request may be issued upon detection of specific objects (e.g., hazards such as puddles of water on a floor ahead of the robot 102) which may cause the controller 118 to adjust the trajectory of the robot 102.

Figure 7B:
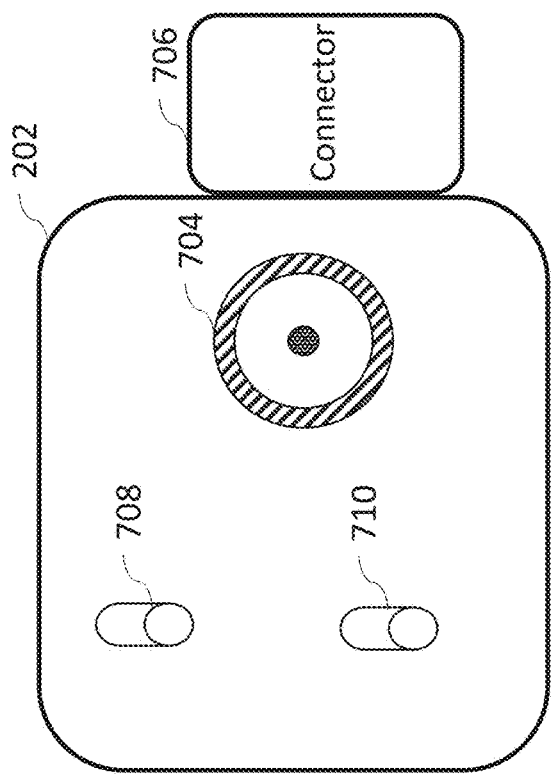
FIG. 7A-B illustrate two exemplary embodiments of a connection interface.
Figure 7A:
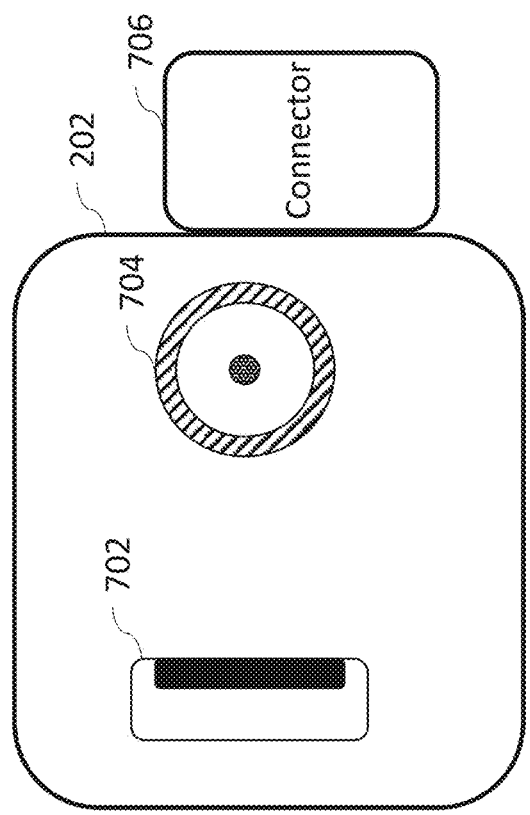

FIGS. 7A-B illustrate two embodiments of a connection interface 202 of a robot 102 for use in coupling a connection interface 302 of a module 204, according to two exemplary embodiments. First, in FIG. 7A, connector 702 may be utilized as an input/output for data channels 606 and 608. Connector 702 may comprise, without limitation, a USB connector, a USB-C connector, a Cat5 connector, micro USB connector, or other bi-directional supported connector. The connector 704 may supply power from power supply 122 of the robot 102 to the various modules 204 coupled to the connection interface 202 (i.e., connector 704 may be illustrative of power supply 614 shown in FIG. 6). The connector 704 may comprise either male or female connection interfaces, without limitation, of a coaxial cable wherein the modules 204 would comprise the reciprocal connector type (i.e., female or male). It is appreciated that some connectors 702 may be further configured to provide power to modules 204 (e.g., USB), wherein a separate power supply channel may not be necessary.

Both connection interfaces 202 depicted in FIGS. 7A and 7B comprise a connector 706 component. The connector 706 is illustrative of mechanical means for securely attaching one or more modules 204 to the connection interface 202. The mechanical means may comprise, without limitation, latches, pins, hooks, screws, Velcro®, fasteners, snap fits, and so forth. Adhesives and/or permanent screws may be utilized but are not preferred over temporary attachment means in most instances, because permanent attachment mechanisms may render the attached modules 204 un-configurable at later times when desired.

FIG. 7B illustrates another exemplary embodiment of a connection interface 202. The embodiment comprises two pins 708, 710 configured to communicate data between a controller 118 and one or more modules 204. For example, the pin 708 may be utilized to output signals from the controller 118 to one or more modules 204 and pin 710 may be utilized to receive signals from the one or more modules 204 by the controller 118. The modules 204 may include receptive connection interfaces 302, which may include a pair of sockets or holes configured to receive the pins 708, 710.

According to at least one non-limiting exemplary embodiment, pin 708 may be utilized as an address channel 606 and the other pin 710 may be utilized as a data channel 608, as illustrated in FIG. 6 above.

According to at least one non-limiting exemplary embodiment, the pin 708 may comprise an input channel and pin 710 may comprise an output channel, input and output being defined with respect to the controller 118 of the robot 102. Both the input and output channels may embody data channels 606, 608 depicted in FIG. 6 above and may further utilize a timing protocol.

According to at least one non-limiting exemplary embodiment, one or both of the pins 708, 710 may instead comprise a socket or hole configurable to receive a pin of a module 204 (e.g., pin 306 of FIG. 3 above). In any of these embodiments, the connectors are configured to complete a communication channel between the nodule 204 and the controller 118 (e.g., using a wire).

One skilled in the art may appreciate that the various connector types 702, 704, 708, and 710 may be interchanged or replaced with other conventional connector types (e.g., micro-USB, auxiliary, etc.) without detracting from the inventive concepts of this disclosure.

Figure 8:
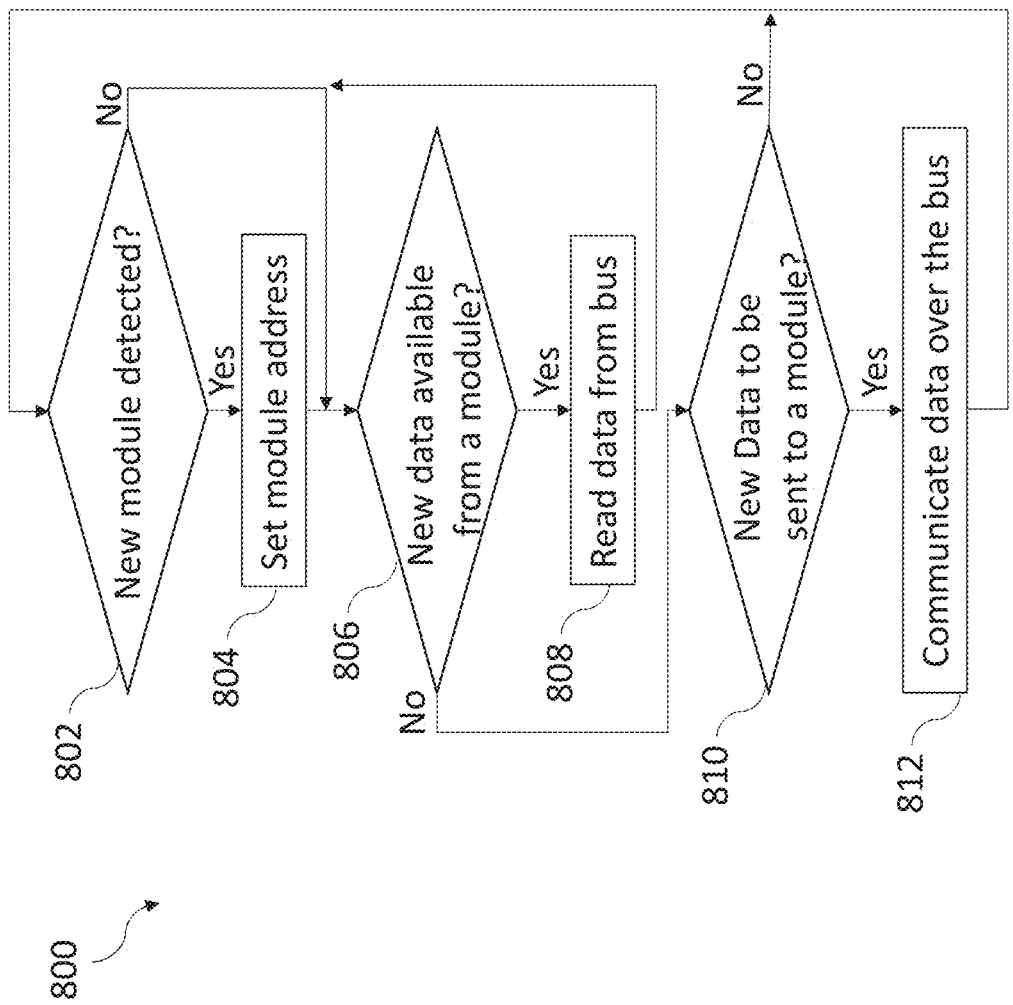
FIG. 8 is a process flow diagram illustrating a method for a controller of a robot to effectuate control of modules coupled thereto, according to an exemplary embodiment.

FIG. 8 is a process flow diagram illustrating a method 800 for a controller 118 of a robot 102 to configure one or more modules 204 coupled thereto, according to an exemplary embodiment. The controller 118 may execute the steps of method 800 by executing computer-readable instructions from a non-transitory computer-readable memory 120.

Block 802 comprises the controller 118 detecting a new module 204. A new module 204 comprises any module 204 which is or is about to be coupled to the robot 102 but was not previously coupled. The new module 204 may couple to the robot 102 via a connection interface 202 on the robot 102 or, if other modules 204 are already coupled to the robot 102, a connection interface 302 of a coupled module 204. In some embodiments, the connection interface 202 may couple the controller 118 directly to two or more modules 204. The new module may be detected based on a change of impedance or other parameter (e.g., Scattering parameters ("S-Parameters"), ABCD-Parameters, etc.) of a bus 606, bus 608, or power line 614; output from a sensory unit (e.g., an optical sensor of connection interface 202, pressure sensor, contact sensor, etc.); output from a circuit (e.g., a NMOS/CMOS/PMOS circuit, tri-state, etc.); and/or a processor 404 of the new module outputting an interrupt request and/or following a predetermined initialization protocol.

Upon the controller 118 detecting a new module 204 being coupled to the robot 102, the controller 118 may move to a block 804.

Upon the controller 118 not detecting a new module 204 being coupled to the robot 102, the controller 118 may move to a block 806.

Block 804 comprises the controller 118 setting the module 204 address in an address register 604. The controller 118 may communicate the address via the address bus 606 or data bus 608. The address may comprise an address not used by any module 204 already coupled to the robot 102.

According to at least one non-limiting exemplary embodiment, each module 204 may comprise a fixed or permanent address, wherein block 804 may comprise the controller 118 reading the address of the new module 204 and storing it in memory 120.

According to at least one non-limiting exemplary embodiment, the new address may be communicated via the controller 118 issuing an interrupt request for all modules coupled to bus 608.

According to at least one non-limiting exemplary embodiment, the controller 118 may communicate the address to the address register 604 using a predetermined communications protocol. For example, the controller 118 may output a signal (e.g., "00101001" or other predetermined digital or analog signal) to the bus 608 which configures (i) existing modules 204 to do nothing and avoid using bus 608, and (ii) the new module to receive an address that follows the output signal.

Block 806 comprises the controller 118 determining if new data is available from a module 204 coupled to the robot 102. In some embodiments, the new data may comprise a data packet (e.g., a 1 kB, 1 GB, etc. packet of data). The data available may be from any module 204 including previously connected modules or the new module 204, if present, detected in block 802.

According to at least one non-limiting exemplary embodiment, the controller 118 may detect if new data is available upon receiving an interrupt request from one or more modules 204 coupled to the robot 102. The interrupt request may further comprise an address of the module 204 making the request. The interrupt request comprises a module 204 requesting the controller 118 halting current operations on one or more threads and servicing the interrupt request issued by the module 204 and subsequently returning to the operations. Alternatively, the controller 118 may utilize an unused thread to service the interrupt request.

According to at least one non-limiting exemplary embodiment, the controller 118 may cycle through the memory addresses of all modules 204 coupled thereto and read data, if available, from each module 204 sequentially and subsequently move to a block 810.

According to at least one non-limiting exemplary embodiment, modules 204 may be coupled to a bus 608 using, for example, a buffer register which is configurable to output an indication (e.g., a binary value) corresponding to data being available from the modules 204. If data is not available from a module 204, the controller 118 may skip reading data from that module 204.

Upon the controller 118 determining new data is available from the module 204, the controller 118 may move to a block 808.

Upon the controller 118 determining no new data is available from the module 204, the controller 118 may move to a block 810.

Block 808 comprises the controller 118 reading data from the data bus 608. The controller 118 may output an address of the module 204 from which data is to be read using the address register 604 and the address bus 606, as depicted in FIG. 6, to open a communication channel between the controller 118 and the desired module 204. The controller 118 may subsequently read data stored, for example, in a buffer register configurable to hold the data packet until requested by the controller 118. Data read from the bus 608 may comprise, without limitation, sensor data from sensor unit 408 (e.g., LiDAR data, depth-camera data, temperature data, data from gyroscopes, accelerometers, etc.), usage data from utility units 410 (e.g., data usage for a mobile cellular hot-spot), metadata, and/or status data of module(s) 204 (e.g., activated or deactivated).

According to at least one non-limiting exemplary embodiment, a bus 608 may comprise two unidirectional data buses, wherein data may be communicated from the module 204 to the controller 118 on a separate communication channel or wired connection from data being communicated by the controller 118 to one or more modules 204.

Block 810 comprises the controller 118 determining if new data is to be sent to a module 204 coupled to the robot 102, the module 204 being a preexisting module or the new module detected in block 802. Data communicated to a module 204 may include, for example, control signals (e.g., enable/disable signals), interrupt requests, and/or status data.

Upon the controller 118 determining no data is to be sent to any module, the controller 118 returns to block 802 and repeats the method 800.

Upon the controller 118 determining data is to be communicated to a module 204, the controller 118 may move to block 812.

Block 812 comprises the controller 118 communicating data over the bus to the module 204. The controller 118 may set an address in the address register 604 to the module 204 with which the controller 118 is to communicate.

According to at least one non-limiting exemplary embodiment, a controller 118 may perform the determinations in blocks 806 and 810 in any order and/or in parallel. For example, for each module 204 coupled to a connection interface 202 of the robot 102, the controller 118 may (i) check if data is to be read from the module 204 and, if so, read the data; (ii) check if data is to be sent to the module 204 and, if so, send the data; and (iii) repeat (i-ii) for another module 204, and so forth for each module 204 coupled to the robot 102. As another example, one thread of the controller 118 may read incoming data from the module(s) 204 and another thread may communicate data to the module(s) 204. As a third example, one thread may send and receive data between the controller 118 and module(s) 204 while another detects attachment and configures addresses of new module(s) 204. That is, the steps of method 800 are intended to illustrate various steps executed by a controller 118 to effectuate control of modules 204 coupled thereto, wherein some of the steps may be rearranged, as appreciated by one skilled in the art.

Figure 9:
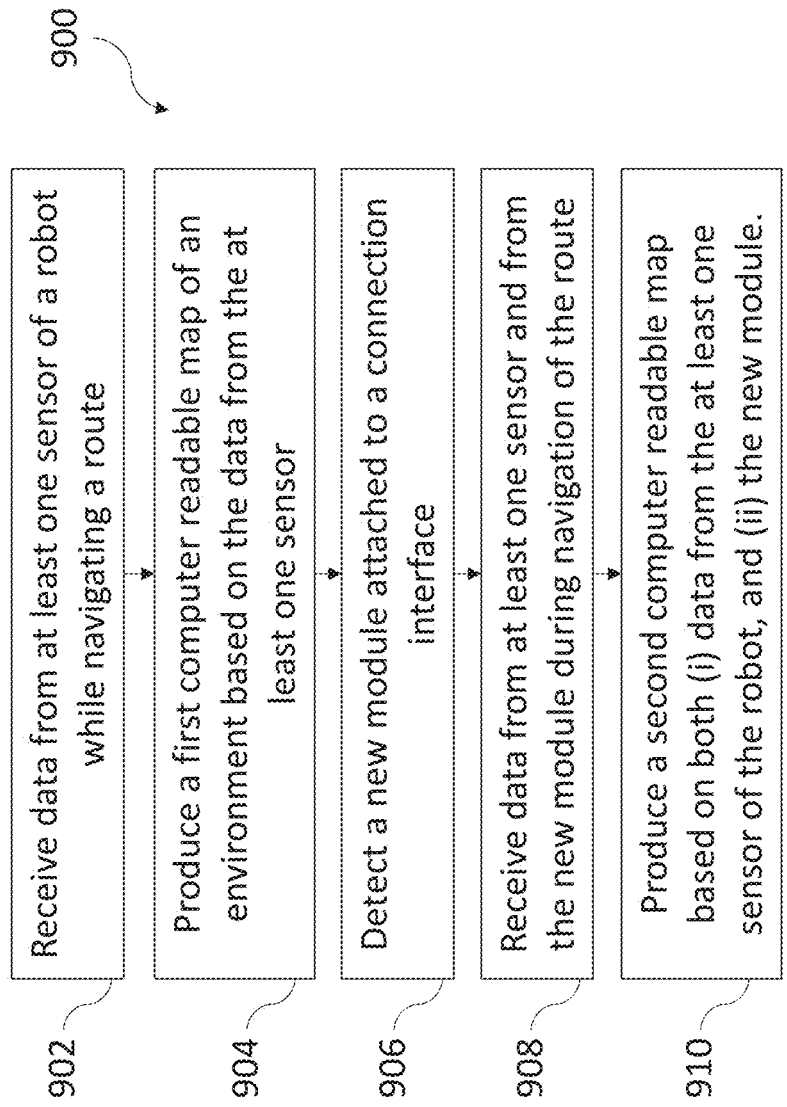
FIG. 9 is a process flow diagram illustrating a method for a controller of a robot to enhance a computer-readable map based on data from a new module coupled thereto, according to an exemplary embodiment.

FIG. 9 is a process flow diagram illustrating a method 900 for a controller 118 of a robot 102 to utilize a module 204 to enhance a computer-readable map, according to an exemplary embodiment. The steps of method 900 executed by the controller 118 may further comprise the controller 118 executing computer-readable instructions stored in memory 120.

Block 902 comprises the controller 118 receiving data from at least one sensor unit 114 during navigation of a route. The at least one sensor unit 114 may comprise a first set of sensors. The data from the at least one sensor unit 114 may comprise, for example, LiDAR data (e.g., as illustrated in FIG. 5A above), depth-camera data (e.g., depth images), colorized image data, video data, and/or any other data collected by sensor units 114 described with respect to FIG. 1A above. The data from the at least one sensor unit 114 may further comprise odometry data that may yield a position of the robot 102 during execution of the route. The data from the at least one sensor unit 114 may be utilized to produce a first computer-readable map of an environment surrounding the route in block 904. The first computer-readable map may comprise no additional information other than what sensor units 114 of the robot 102 may provide.

Block 904 comprises the controller 118 producing a first computer-readable map of the environment surrounding the route based on the data from the at least one sensor. The first computer-readable map may comprise, without limitation, localized objects detected by sensor units 114, a path followed by the robot 102, the route (which may be different from the path), a cost map, and/or any identified and localized features. The computer-readable map may be of any resolution and stored in the memory 120 using any format (e.g., a tensor, an image, etc.).

Block 906 comprises the controller 118 detecting a new module 204 attached to a connection interface 202. An operator of the robot 102 may couple the module 204 to the robot 102 by attaching the module 204 to the connection interface 202 as depicted in FIGS. 2, 3, 5A-B, 6, and 7A-B above. The controller 118 may detect the attachment of the new module 204 based on, for example, an output from a sensor, a handshake protocol, or other method as discussed with respect to block 802 of FIG. 8. In some embodiments, the new module 204 may comprise a sensor unit 408 configured to sense or measure the environment external to the robot 102. In some embodiments, the new module 204 may comprise a sensor unit 408 configured to sense or measure internal characteristics of the robot 102 such as its position, speed, tilt, etc., wherein sensor unit 408 may include gyroscopes, accelerometers, and/or other IMUs.

Block 908 comprises the controller 118 receiving data from the at least one sensor unit 114 and from the new module 204 during navigation of the route. The at least one sensor unit 114 corresponds to the one or more sensors described in block 904 and used to produce the first computer-readable map (i.e., the first set of sensors). The data received from the module 204 arrives from a connection interface 202 (i.e., a bus 608; data port(s) 702 or 708, 710; etc.). The data received comprises sensor outputs or measurements. Data from both the at least one sensor unit 114 and from the new module 204 may be stored in memory 120 of the robot 102 and utilized to produce a second computer-readable map in block 910. The first set of sensors in addition to the sensor unit 408 of the coupled module 204 may comprise a second set of sensors.

Block 910 comprises the controller 118 producing a second computer-readable map based on both (i) data from the at least one sensor unit 114 described with respect to block 904, and (ii) the new module 204. The second computer-readable map may comprise a map of the same environment as the first computer-readable map produced in block 904, however the second computer-readable map would comprise additional information based on data collected by a sensor unit 408 of the new module 204. For example, the new module 204 may comprise a temperature sensor configurable to measure temperature external to the robot 102. Temperature data collected during the navigation of the route, in conjunction with localization data of the robot 102 from the at least one sensor unit 114, may be utilized to produce the second computer-readable map, wherein the second computer-readable map may include all of the features and objects detected in the first computer-readable map in addition to temperature data measured throughout the environment (e.g., as similarly shown with map 510 of FIG. 5B). That is, the second computer-readable map may comprise more information than the first map because the controller 118 may utilize additional data from module 204, the additional data being configurable based on an operator of the robot 102 determining the temperature data is of value and coupling the temperature sensor module 204 to the robot 102. In some instances, the second computer-readable map may correspond to updates to the first computer-readable map rather than being a distinct map stored in memory 120 separate from the first map.

According to at least one non-limiting exemplary embodiment, the data from the new module 204 and/or the second computer-readable map may be communicated to a server for additional processing or for producing, in part, the second computer-readable map. The controller 118 may send the second computer-readable map via a wireless or wired communications channel using communications units 116. For example, the new module 204 may include a color (e.g., RGB) camera sensor 408 configured to capture images as the robot 102 navigates the route. The images may be communicated to the server, wherein the server may comprise one or more processing devices 138 (e.g., as shown in FIG. 1B) which embody a neural network. The neural network may be configured to identify one or more features (i.e., specific objects or characteristics thereof such as "human," "cereal," "chair," etc.) within images captured by the sensor 408 of the new module 204. The server may receive the images, utilize the neural network to identify the one or more features, and communicate the identified features to the controller 118 via communications units 116. The features may then, in conjunction with data from the other at least one sensor units 114, be utilized to produce the second computer-readable map which may comprise localized features (e.g., locations of identified items, such as "banana" or "apples" within a supermarket). In some embodiments, the neural network may be embodied by the controller 118 or a module 204 comprising a processor 404 and memory 406 configured to do so.

According to at least one non-limiting exemplary embodiment, the module 204 may include a sensor unit 408 configurable to measure internal characteristics of the robot 102. For example, the sensor unit 408 may include an IMU (e.g., a gyroscope, accelerometer, etc.) which may be of higher precision than IMUs of the sensor units 114 of the robot 102. Accordingly, the data from the higher precision IMU may be utilized to enhance the second computer-readable map by enabling the controller 118 to more accurately measure the position of the robot 102 within its environment, thereby causing the second computer-readable map to more accurately represent the environment than the first computer-readable map.

Advantageously, the coupling of modules 204 to a controller 118 of a robot 102 may enable robots 102 to produce computer-readable maps with enhanced detail. The enhanced detail may be of use for either or both the robot 102 and humans. As shown in the previous example above, use of an image sensor module 204 may allow for feature identification within environments of existing robots 102 that may comprise no camera sensors. In some instances, the sensor 408 may comprise additional LiDAR sensors, depth sensors, or other sensors comprising a higher resolution than sensor units 114 of the robot 102, wherein computer-readable maps produced, in part, using data from the sensor 408 may enhance accuracy of the map thereby improving navigation capabilities of the robot 102. In some instances, the sensor 408 of an attached module 204 may enhance navigation by sensing objects within a blind spot of the sensor units 114. In each of these exemplary embodiments, the module 204 may be coupled to the controller 118 using a connection interface 202, which may enable both skilled and unskilled robot operators to quickly configure and/or improve capabilities of their robots 102. In some instances, robot 102 designers may either (i) enhance capabilities of, or (ii) fix problems with existing robots 102 using one or more specialized modules 204 designed for a specific purpose (e.g., a module 204 comprising a depth camera directed towards a blind spot of sensor units 114).

FIGS. 10A-B illustrate a sensor module 204 configured to couple to a robot 102 via connection interface 202 of the robot 102, according to an exemplary embodiment. First, in FIG. 10A, a robot 102 of a default make or model is illustrated. In this example, the robot 102 is a floor-cleaning robot configurable to perform a first set of tasks comprising navigating upon floors, avoiding objects within its environment, and cleaning the floors. The default make or model corresponds to the make or model of the robot 102 produced by a manufacturer of the robot 102, wherein the robot 102 is one of a plurality of identical floor-cleaning robots of the same make or model. That is, the default make or model in this example includes a floor-scrubbing robot capable of navigating and avoiding objects while cleaning floors. The first set of tasks of this robot does not include identifying nearby objects within images captured from the robot 102. In some instances, the configuration of sensor units 114 of the default make or model may be insufficient to accurately identify objects (e.g., camera sensors may be of low resolution, may be oriented in an incorrect direction for detecting shelves, may not be positioned high enough from a floor to see objects on tall shelves, etc.). A customer or user of robot 102 may desire the robot 102 to be configurable to perform additional functions, such as identifying objects on a shelf if the floor-cleaning robot 102 operates within a retail environment such as a grocery store, warehouse, mall, or supermarket.

The default model of the robot 102 may include a panel 1002 that covers a plurality of connections, further shown in FIG. 10B, which couple various operative units 104 to the controller 118 (not shown) of the robot 102. For example, power supply 122 may comprise batteries shown in FIG. 10A, which are coupled to the controller 118 and various operative units 104 via one or more cables or wires.

Next, in FIG. 10B, a module 204 is coupled to the floor-cleaning robot 102 via the connection interface 202. Panel 1002 shown in FIG. 10A has been removed for clarity to show the connection interface 202. The connection interface 202 may include various hardware data connectors such as USB connectors, CAT-5 connectors, coaxial cable connectors, and/or other hardware data connectors. The module 204 illustrated may include one or more lights 1004 and cameras 1006 configurable to capture images of objects within the environment with a uniform lighting condition provided by the lights 1004. Following the shelf scanning exemplary embodiment described above, the lights 1004 and cameras 1006 may be positioned at a height such that the images produced by the cameras 1006 (i) capture items on tall shelves, and (ii) comprise uniform lighting such that the items on shelves are easily identifiable (e.g., by image-recognition models). In the illustrated embodiment, a second set of lights 1004 and cameras 1006 are disposed at the bottom of the module 204 to allow for imaging of low-level shelves. These lights 1004 and cameras 1006 may be tuned to the environment of the robot 102 (e.g., the camera 1006 height and brightness of lights 1004).

In the illustrated embodiment, the module 204 extends vertically from the body of the robot 102 to allow the upper cameras 1006 to be able to image tall objects (e.g., tall shelves). The robot 102 in this embodiment comprises a ride-on floor scrubbing robot configured to be operated as either a ride-on manual scrubber or as an autonomous floor cleaning robot. The module 204 is positioned near the rear of the robot 102 as not to obscure the vision or movement of a driver. In other applications, the module 204 may be positioned near the front or center of the robot 102. For example, for robots 102 configured to transport items via tugging, dragging, or pulling the items, positioning the module 204 near the front-end of the robot 102 may be desirable as to avoid obstructing the items to be transported.

The images from the two cameras 1006 may be stitched together to form singular images which span the height of the combined fields of view of the two cameras 1006.

The module 204 may comprise a surface that couples to the connection interface 202 and a portion of the robot 102 chassis, as shown by contour line 1008 (white dashes). The contour line 1008 may illustrate mechanical means for affixing the module 204 to the robot 102, which may further include latches, bolts, and/or other mechanical connection means described above that are obscured from view in the illustration. The contour line 1008 may further illustrate that the surface of the module 204 which is in contact with the robot 102 is specifically designed for the make or model of the robot 102 and therefore requires no or very few changes to the robot 102 chassis to enable coupling of the module 204 to the robot 102. In the embodiment illustrated in FIGS. 10A-B, no panels or external portions of the robot 102 are changed to couple the module 204 to the robot 102 because the module 204 comprises a connection interface 302, which includes the mechanical means for coupling to the specific make or model of robot 102, as shown by contour 1008. In the picture shown in FIG. 10B, panel 1002 is removed for clarity and to enable electrical connection of the module 204 to the controller 118 of the robot 102. Panel 1002 may be returned to cover the connection interface 202 upon the robot 102 returning to operation (not shown). In some embodiments, one or more screws, latches, bolts, etc. may be required to couple the module 204 to the robot 102 chassis. It is appreciated that specifically designing the module 204 to couple to a specific make or model of robot 102 may significantly reduce the number of mechanical modifications required to couple the module 204 to the robot 102.

According to at least one non-limiting exemplary embodiment, module 204 may be replaced by two separate modules 204, one being configured to capture images and process the images to identify objects on shelves and the other being configured to provide uniform illumination of the visual scene of the images. The two modules 204 may be coupled to each other by their respective connection interfaces 302, wherein one module 204 couples to the robot 102 via the connection interface 202 of the robot 102. In some instances, the two modules 204 may be encased within a protective layer, such as a plastic sheet for example as shown in FIG. 10B.

According to at least one non-limiting exemplary embodiment, controller 118 may process images captured by the camera 1006 and identify objects depicted therein using one or more image recognition models. Alternatively, in some embodiments, a processor 404 of the module 204 may execute the image-recognition models to identify features depicted within imagery captured by the camera 1006 and subsequently communicate the identified objects to the controller 118 (e.g., using labeled or annotated images, similar to the labeled shelf 504 shown in FIG. 5B). In some embodiments, the annotated images may also be communicated to an external server either directly from module 204 or via controller 118, wherein the information in the annotated images is further processed for inventory control, shelf stocking, or other purposes desired by the user.

According to at least one non-limiting exemplary embodiment, the module 204 may be coupled to the robot 102 in a different location than as illustrated in FIG. 10B, wherein coupling the module 204 in the illustrated position is not intended to be limiting. One skilled in the art may appreciate that the location of the module 204 when coupled to the robot 102 may further depend on the size and shape of the robot 102 (i.e., its chassis or body), the specific functionality of the module 204, and/or any mechanical considerations such as instability (i.e., balance), weight, and the configuration of sensor units 114 (i.e., to not obstruct fields of view of exteroceptive sensor units 114). In some embodiments, two or more modules 204 may be coupled to the robot 102 at different locations. For example, a second module 204 may be coupled to the left side of the robot 102 (left with respect to the illustration in FIG. 10B) such that cameras 1006 capture images on both the left and right sides of the robot 102. Alternatively, the module 204 may comprise more than one camera 1006 and/or lights 1008 to allow for more than one point of view.

Figure 10C:
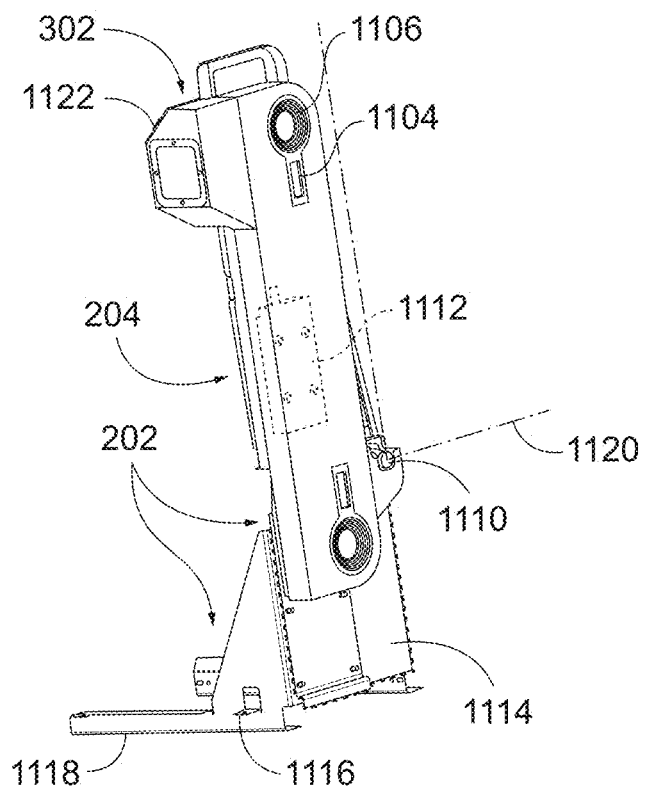
FIG. 10C illustrates a sensory module configured to image objects to detect features thereof, according to an exemplary embodiment.

FIG. 10C illustrates a computer aided design ("CAD") rendering of the feature scanning module 204 shown and described in FIG. 10B above, according to an exemplary embodiment. The outer casing is shown as being semi-transparent to enable viewing of the internal components of the module 204. Device 1112 may house the operative units 402, processor 404, memory 406, communications units 412, and, in some embodiments, communications devices 1212. Communications devices 1212, shown and described in more detail in FIG. 12 below, comprise of Wi-Fi or cellular LTE transceivers configured to communicate with an external server, unlike communications units 412 configured to communicate with the controller 118 of the robot 102.

The module 204 includes a connection interface 202 comprising of hardware data connector ports and physical connector components 1116, 1118. The hardware data connector ports, obscured from view from the illustrated perspective, include various ports for data connectors to couple the module 1120 to the controller 118 of the robot 102 such as coaxial cables, USB cables, wires, etc. The physical connector components include longitudinal beams 1118 and screw pads 1116. Screw pads 1116 are configured to house one or more screws to secure the module 204 to the body of the robot 102. Longitudinal beams 1118, which extend distally from a panel 1114 at the base of the module 204, provide for horizontal stability of the module 204, which may be required due to the height of the module 204. Longitudinal beams 1118 may further include screw holes for securing the beams 1118 to the robot 102 body. The combination of screw pads 1116 and longitudinal beams 1118 provide the module 204 with horizontal stability along both horizontal axes. These beams 1118 are inserted into a connection interface of the robot 102, as shown next in FIG. 10E. Once the beams 1118 are inserted, the screw pads 1116 may be secured to the robot 102 body using screws.

The module 204 further includes a planar LiDAR sensor 1110. The LiDAR sensor 1110 may comprise a field of view 1120 which encompasses an area above the robot 102 and ahead of the module 204 along the forward direction of travel of the robot 102, shown next in FIG. 10D. The LiDAR sensor 1110 may enable the robot 102 to sense objects above its body which may collide with the module 204 due to its added height, wherein the sensor units 114 of the robot 102 may not be configured to sense this region as, absent the module 204, the robot 102 is not required to do so to navigate safely.

The module 204 may further include an upper-steel camera 1122, which may be considered as a separate module 204 configured to be coupled to the feature scanning module 204 via a connection interface 302. The upper-steel camera 1122 may be an optional feature configured to image high-up objects, such as tall shelves or upper levels of warehouse shelves. Depending on the environment and objects to be scanned for features, the use of the upper-steel camera 1122 may or may not be necessary. In environments where it is necessary or desired, the upper steel camera 1122 may be coupled to the feature scanning module 204 via a connection interface 302. For example, the module 204 shown in FIG. 10B does not include the upper-steel camera 1122. Advantageously, by configuring the module 204 to include a connection interface 302 enables the module 204 to be configured to adapt to unique environmental situations. The upper-steel camera 1122 may be angled upward (e.g., at about a 20°-60° angle) with respect to the other one or more cameras 1106 of the feature scanning module 204 to view the tall objects without adding additional height to the feature scanning module 204. Images captured by the upper-steel camera 1122 module 204 may be communicated directly to the processor 404 of the feature scanning module 204 and handled in the same manner as images captured by cameras 1006, as further described in FIG. 12 below.

According to at least one non-limiting exemplary embodiment, the upper-steel camera module may be replaced with a 360° camera module.

Figure 10D:
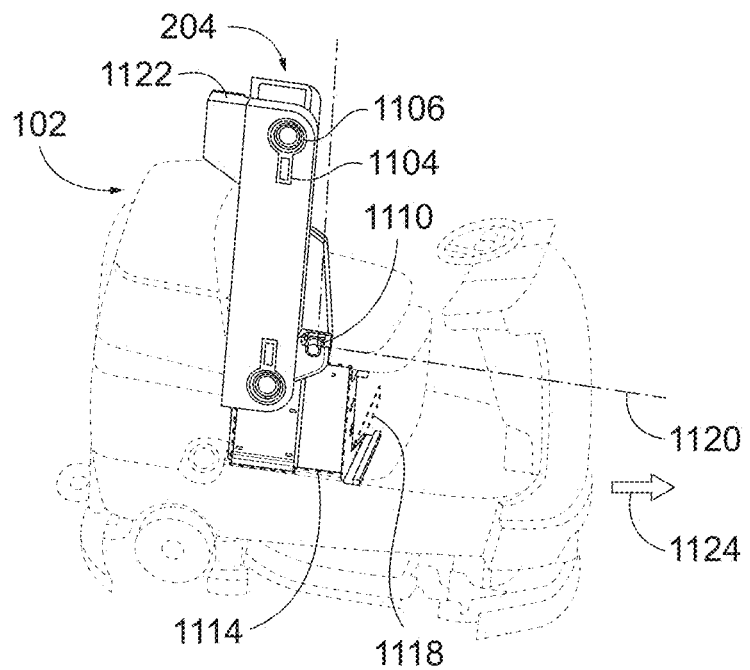
FIG. 10D illustrates a sensory module configured to image objects to detect features thereof being coupled to a robot, according to an exemplary embodiment.

FIG. 10D illustrates the feature scanning module 204 coupled to a robot 102, according to an exemplary embodiment. As illustrated, the cameras 1106 capture images of objects along the right-hand side of the robot 102, right/left being define with respect to the forward direction 1124 of the robot 102. It is appreciated that in other embodiments, the module 204 may be coupled to the left-hand side of the robot 102. Due to the added height of the robot 102 and module 204 system, the LiDAR sensor 1110 may be utilized to sense a region 1120 ahead of the module 204 and above the robot 102 body, ahead being along the forward direction 1124. The LiDAR sensor 1110 may detect the presence of any overhead objects which may collide with the module 204 and, if an object is detected (e.g., by processor 404 processing the LiDAR data), the processor 404 of the module 204 may communicate with the controller 118 to stop the robot 102 or to navigate around the overhead object.

Longitudinal beams 1118 have been inserted into the robot 102 body, as shown by a dashed outline extending inward to the robot 102 body. The panel 1114 is approximately flush with the outer surface of the robot 102 to provide a protective layer for the internal components of the robot 102 and to replace a panel covering the previously unused connection interface 202. Screw pads 1116, not shown, have also been secured to the robot 102 body using screws. Once the longitudinal beams 1118 and screw pads 1116 are secured, hardware data connectors may be wired from the module 204 to ports of the robot 102 which communicate with the controller 118 (e.g., motherboard ports).

Figure 10E:
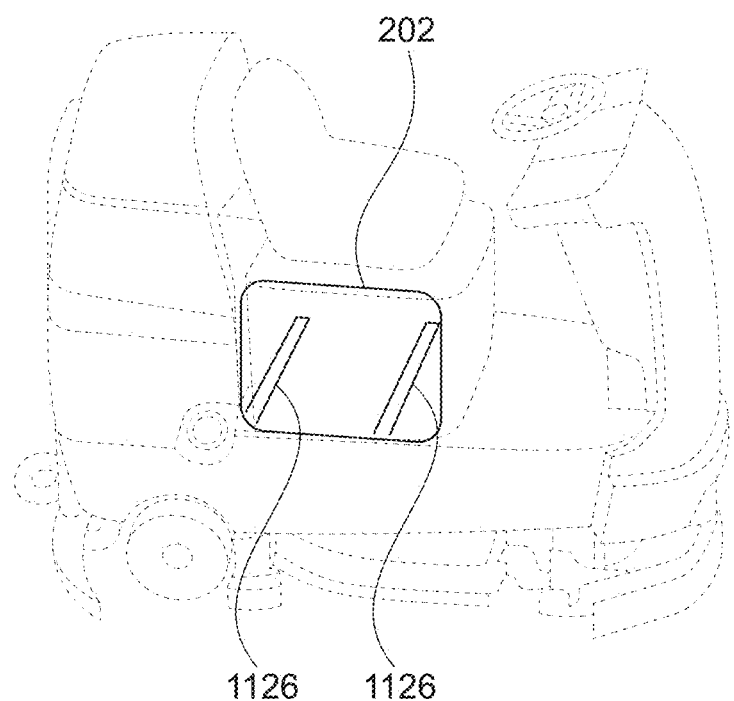
FIG. 10E illustrates a profile view of a robot comprising a connection interface used to couple the robot to a sensory module, according to an exemplary embodiment.

For visual reference, FIG. 10E illustrates the robot 102 without the feature scanning module 204 coupled thereto, according to an exemplary embodiment. Connection interface 202 may be typically hidden by a side panel of the robot 102 until a module 204 is desired to be coupled to the robot 102. Behind the panel, which has been removed for clarity, connection interface 202 may include two slots 1126 which extend laterally into the robot 102 body. These slots 1126 are configured to house longitudinal beams 1118.

Figure 11:
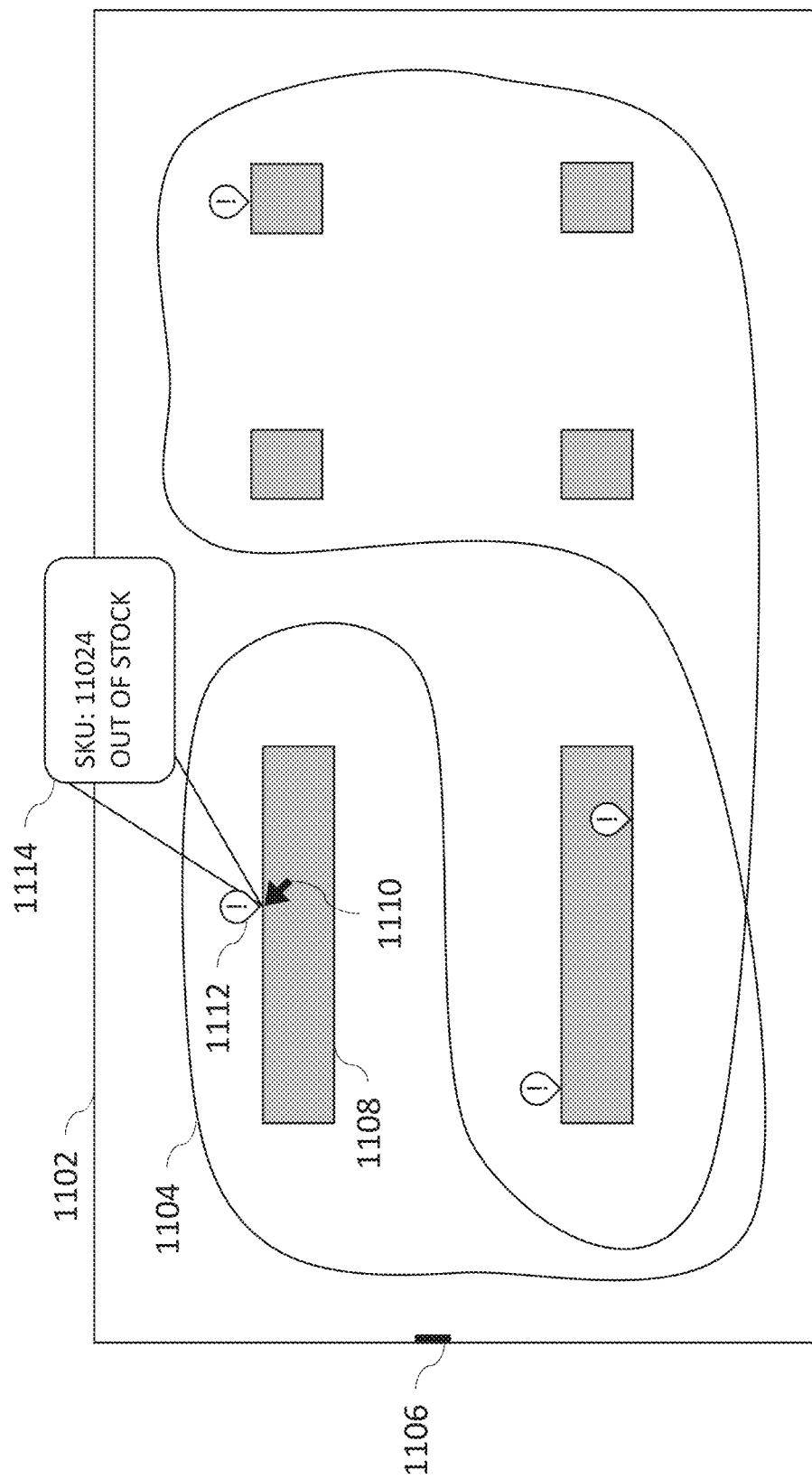
FIG. 11 is a computer-readable map created, in part, using data from a sensory module, according to an exemplary embodiment.

FIG. 11 is a computer-readable map 1102 generated using, at least in part, data from a module 204 configured to capture images of objects 1108 to identify features thereon as shown in FIG. 10B above, according to an exemplary embodiment. The module 204 used by the robot 102 may include lights 1004, cameras 1006, processors 404, and memory 406. The lights 1004 and cameras 1006 are configured to capture images of the objects 1108 as the robot 102 navigates a route 1104 through the environment. The images captured may depict various features of the objects 1108. For example, the objects 1108 may be shelves containing items to be identified for inventory tracking purposes. The route 1104 begins proximate to a landmark 1106 which is detected by sensor units 114 of the robot 102 to provide the robot 102 with an initial location. Although the route 1104 is shown as being a cyclic route, one skilled in the art may appreciate that other non-cyclic routes may also be used.

As the robot 102 collects images while navigating route 1104, the processors 404 and memory 406 may store and process the images to identify features depicted therein. The processors 404 may embody one or more neural network models, image comparison models, or other feature recognition models known within the art to identify the features. The identified features may be stored in memory 406 of the module 204 or may be communicated to the controller 118 such that it is stored in memory 120.

According to at least one non-limiting exemplary embodiment, the module 204 may include the lights 1004, cameras 1006, processors 404 and memory 406 in addition to communications units. The communications units may communicate with an external server coupled to the robot 102 using LTE or Wi-Fi networks. The communications units may include any or all of the devices discussed in FIG. 1A with respect to communications units 116 of the robot 102. In this embodiment, and as discussed above, it may be desirable to off-load the computations needed to identify features within the images captured by the cameras 1006 to the server. Accordingly, the module 204 may capture images and communicate them to the server via its communication units. Alternatively, the module 204 may leverage the communications units 116 of the robot 102 to communicate with the server, wherein the processor 404 of the module 204 may communicate compressed images to the controller 118 for it to upload the images to the server. The server may, later, communicate features identified in the images (e.g., using bounding boxes, histograms, etc.) to the robot 102 to enable the robot 102 to construct a computer-readable map 1102.

Once the features are identified, the processor 404 or controller 118 may further process the computer-readable map 1102 to identify alerts 1112. Alerts 1112 may indicate out of stock items, misplaced items, low or high turnover items, and/or other metrics. To identify misplaced or out of stock items, the processor 404 may utilize a reference database or planogram database which details the ideal locations of all products within the environment, wherein any deviation from the reference planogram database may indicate a misplaced, missing, or out of stock item.

The alerts 1112 may be placed on the map 1102 based on data from controller 118, more specifically the location data of the robot 102 while the robot 102 navigates route 1104. That is, the module 204 leverages existing functions of the robot (i.e., its localization capabilities) to produce the map 1102 using, in part, additional data collected from sensors of the module 204. The features identified in the images may be correlated to a location in on the map 1102 based on the location of the robot 102 when the images were obtained.

The map 1102 may be displayed to a human via user interface units 112 to allow the human to view details 1114 of each alert 1112. For example, the user may click or tap on the location of an alert 1112, as shown by cursor 1110, to view the details 1114. In the illustrated embodiment, an item denoted by its SKU of 11024 is detected as being out of stock. Other alerts 1112 may contain different details, such as low-stock items, misplaced items, locations where the image recognition models fail (e.g., due to environmental conditions, such as unreadable or damaged barcodes, excessive lighting, etc.), and/or other alerts.

In some embodiments, the images captured by the module 204 may be further utilized to construct a 3-dimensional digital view of the environment. Camera(s) 1006 or upper steel camera 1122 may include a 360° field of view around the module 204 to provide a full panoramic view of the environment as seen by the camera(s) 1006. The controller 118 may further enhance the map 1102 to enable the user to click/tap on locations on the route 1104 to view the environment. Since the controller 118 localizes the robot 102 at all times, the panoramic images may be localized to a position on the map 1102. Users may scroll through images captured sequentially along the route to effectively navigate, digitally, through the environment to view it from a remote location.

It is appreciated that the robot 102 may be executing other tasks while the module 204 captures images of objects 1108. For example, robot 102 may include a floor cleaning robot configured to clean, vacuum, or scrub floors as it navigates along route 1104. In some embodiments, the robot 102 may be required to navigate slower to capture high-quality images free from blur caused by vibrations in the cleaning mechanisms, however the robot 102 is still able to simultaneously clean and capture images of the objects 1108. That is, coupling the module 204 to a robot 102 may limit the maximum speed of the robot 102 to one suitable for imaging objects free from blur which depends on intrinsic parameters of the camera 1106 (e.g., shutter speed). As another example, the robot 102 may transport items from one location to another, wherein the module 204 captures images of objects 1108 as the robot 102 passes by. One skilled in the art may appreciate that a module 204, as shown and described in FIG. 10-11 may be used by a wide verity of robots 102 configured for different tasks than imaging objects 1108 to detect features thereon. Advantageously, the module 204 expands the utility of the robot 102 by expanding its functions while not substantially effecting its performance in executing those functions.

Figure 12:
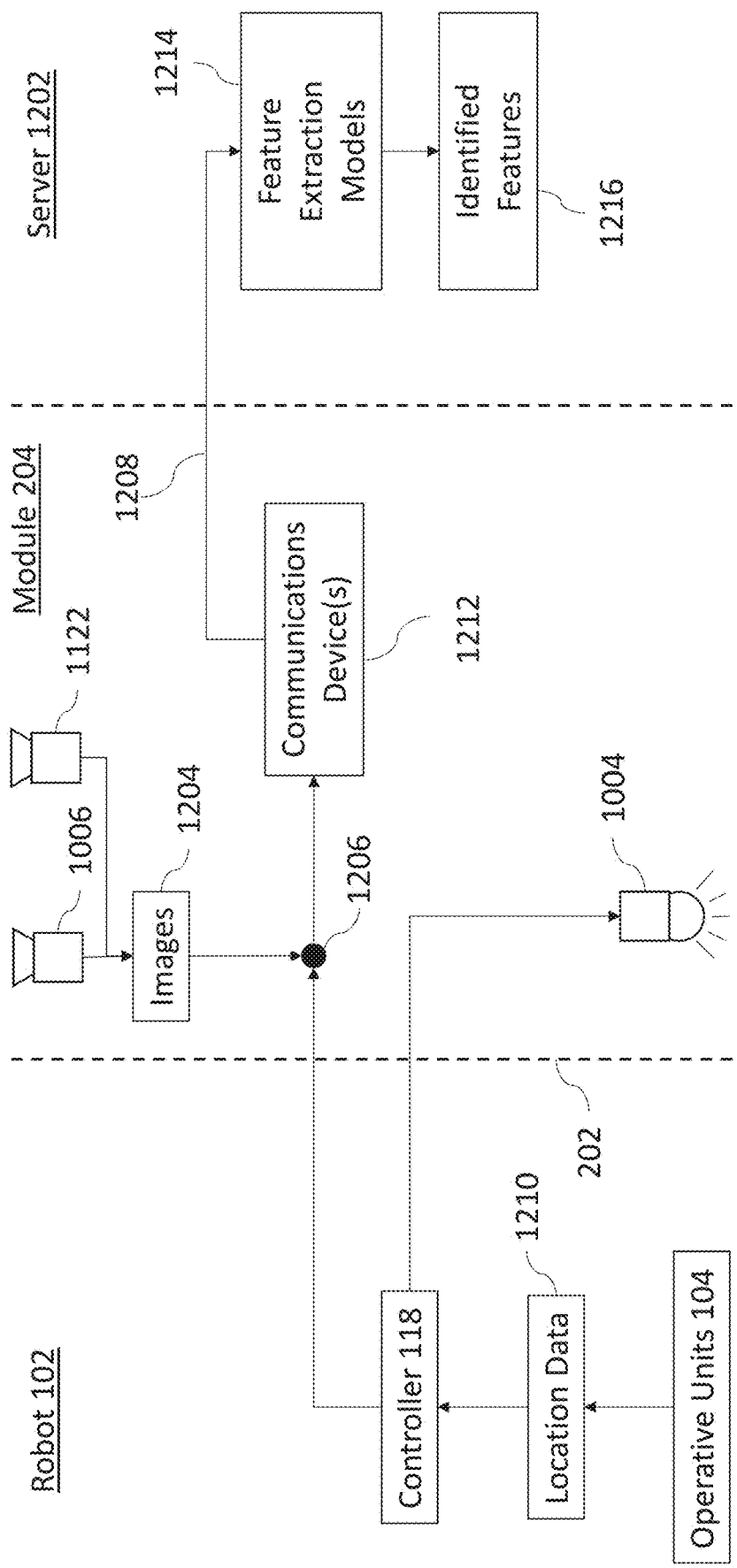
FIG. 12 is a functional block diagram illustrating operation of a sensory module configured to identify features within an environment, according to an exemplary embodiment.

FIG. 12 is a functional block diagram illustrating the use of a feature identification module 204, shown in FIG. 10B above, by a robot 102, according to an exemplary embodiment. The module 204 may be configured to capture images 1204 using one or more cameras 1006 and communicate the images to the robot 102 via the connection interface 202. The module 204 may be configured to receive signals from the controller 118 of the robot 102 to activate or deactivate the light 1004. In some instances, the light 1004 may be activated or deactivated based on the location of the robot 102. For example, if the cameras 1006 are imaging a freezer door, excessive light may obscure the features behind the door due to glare. Typically, a user may predefine specific regions in the environment (e.g., on a computer-readable map via user interface units 112) where the light 1004 should be on or off, wherein the processor 404 using the location data 1210 may determine the correct on/off state of the light 1004. In other instances, the light 1004 is kept on so long as the camera 1006 is collecting images 1204.

According to at least one non-limiting exemplary embodiment, the light 1004 is controlled by a processor 404 of the module 204 based on location data 1210 provided to the processor 404 from controller 118. That is, light 1004 may be turned on or off by the processor 404 of the module 204, rather than directly from the controller 118 of the robot 102 based on the location of the robot 102.

While the module 204 is capturing images 1204, the controller 118 of the robot 102 may continue to operate the robot 102 by navigating it along a route. In doing so, the controller 118 is provided with continuously updated location data 1210 determined from data from various operative units 104 described in FIG. 1A above. This location data 1210 may be passed to the module 204, wherein a processor 404 of the module 204 (not shown) performs an operation 1206. The operation 1206 may comprise the processor 404 correlating the images 1204 to a location, the location corresponds to the location of the robot 102 when each of the images 1204 is captured. The processor 404 may correlate the location and images by, for example, encoding each image with location metadata or generating a separate file, matrix, table, etc. denoting the location of each image 1204. The same may be performed for images captured by the upper steel camera 1122, if one is present.

According to at least one non-limiting exemplary embodiment, the operation 1206 may be performed by controller 118 of the robot 102. However, the controller 118 may be preoccupied with other tasks in operating the robot 102 (i.e., following a path), wherein performing the operation 1206 separately may reduce the computations required to be executed by the controller 118. Thus, it is preferred, though not required, to perform operation 1206 using processor 404 of the module 204.

Once the images 1204 are correlated to a location by operation 1206, the images may be passed to one or more communication device 1212. Communication device 1212 differs from communications units 412 shown in FIG. 4 as communications units 412 are configured to operate busses 418, 420 and communicate directly with the controller 118, whereas communications device 1212 is configured to communicate wirelessly with a remote server 1202 using Wi-Fi or cellular LTE networks.

According to at least one non-limiting exemplary embodiment, the processor 404 of the module 204 may leverage the communications units 116 of the robot 102 to send the images to the server 202. However, in some instances, the communications units 116 may not be configured to handle transmission of large amounts of data, wherein it is preferred, though not required, to utilize a separate communications device 1212. Further, using the separate communications device 1212 may enable higher-bandwidth transmission of data as compared to using the default communications units 116 of the robot 102 (i.e., module 204 may be designed with high-throughput in mind, whereas robot 102 may not have been designed with such considerations).

The communications devices 1212 may issue a signal 1208 to the server 1202, the signal 1208 comprising a wireless signal transmitted over Wi-Fi or LTE networks. The signal 1208 contains the images 1204 and their location data 1210. The images 1204 may be passed to one or more feature extraction models 1214 configured to identify a subset of features. The feature extraction models 1214 may embody neural networks (e.g., convolutional), image comparison models, and/or other models used to identify features within images known within the art. The feature extraction models 1214 may output a plurality of identified features 1216. The identified features 1216 may include, for example, images with labeled bounding boxes denoting SKU's of items, an itemized inventory report, exception reports (i.e., missing or misplaced items), and/or a computer-readable map similar to map 1102 shown in FIG. 11 comprising locations for each identified feature, the locations being based on location data 1210 correlated with the images 1204. The identified features 1216 may be communicated to any one or more of (i) the robot 102 (e.g., to display a map 1102 on its user interface units 112), (ii) the module 204 to be stored in memory 406, or (iii) an external device, such as a personal computer of a store owner or manager to enable the owner/manager to view the identified features 1216 (e.g., for inventory tracking and monitoring purposes).

Advantageously, module 204 as shown and described in FIG. 10B-12 enables an existing robot 102 to, in addition to its typical tasks, scan for features within its environment. Scanning for features is especially useful in retail or warehouse environments, wherein robots 102 operating in these spaces may frequently pass by displays and/or shelves containing items to be sold during execution of their typical tasks, such as cleaning floors or transporting items. That is, the module 204 enables the robot 102 to scan for features while performing its typical tasks without imposing substantial additional processing requirements for the controller 118. The controller 118 is only required to pass location data 1210, which is already received continuously during its operation, to the processor 404 of the module 204.

According to at least one non-limiting exemplary embodiment, the location data 1210 may be utilized to adjust camera properties of the one or more cameras 1006. For example, certain locations may be dimly lit and require a longer exposure time. The lighting conditions of the environment may be discerned by the images captured (e.g., using an average of gamma, brightness, luminosity, or other similar parameter of the captured images). In some embodiments, the processor 404 of the module 204 or controller 118 of the robot 102 may determine when the environment is dimly lit and adjust the camera properties accordingly. Other camera properties may be adjusted based on robot location such as shutter speed, focal length, and so forth.

According to at least one non-limiting exemplary embodiment, the one or more cameras 1006 and upper steel camera 1122 may be coupled to servomotors configured to adjust the position of the cameras. The servomotors may, in some instances, be activated to position the cameras 1006, 1122 in fixed positions determined to be optimal to image features of the specific environment of the robot 102. In some instances, the position of the cameras 1006, 1122 may be adjusted in real time as the robot 102 enters certain locations in the environment. For example, in areas where tall objects are present, the servomotors may tilt the cameras 1006, 1122 upward to fully image the tall objects.

According to at least one non-limiting exemplary embodiment, images from the upper steel camera 1122 are only captured at predetermined locations. The predetermined locations may correspond to locations where tall, or high-up objects are to be imaged.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various exemplary embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations may be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open-ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, un-recited elements or method steps; the term "having" should be interpreted as "having at least"; the term "such as" should be interpreted as "such as, without limitation"; the term "includes" should be interpreted as "includes but is not limited to"; the term "example" or the abbreviation "e.g." is used to provide exemplary instances of the item in discussion, not an exhaustive or limiting list thereof, and should be interpreted as "example, but without limitation"; the term "illustration" is used to provide illustrative instances of the item in discussion, not an exhaustive or limiting list thereof, and should be interpreted as "illustration, but without limitation"; adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

What is claimed is:

1. A robotic system, comprising:
a first sensory module comprising:
 a first set of sensors configured to collect data corresponding to internal or external characteristics of the robotic system; and
 a first processor,
 wherein the first sensory module is configured to couple to or decouple from a chassis or body of the robotic system;
the chassis or body of the robotic system comprising:
 an additional set of sensors separate and distinct from the first set of sensors of the first sensory module; and
 at least one additional processor on the chassis or body;
a non-transitory computer readable storage medium comprising computer readable instructions embodied thereon
wherein the at least one processor on the chassis or body is configured to execute the computer readable instructions to,
 perform a first set of autonomous tasks by producing a first computer readable map of an environment using data from the additional set of sensors of the chassis or body wherein the additional set of sensors is in communication with the at least one processor on the chassis or body, based on computer readable instructions associated with the additional set of sensors; and
wherein the first processor on the first sensory module is configured to execute computer readable instructions associated with the first set of sensors on the first sensory module to,
 cause the at least one additional processor to produce a second computer readable map based on data from the first set of sensors on the first sensory module and data from the additional set of sensors upon the at least one additional processor detecting coupling of the first sensory module to the robot chassis, wherein the data from the first set of sensors on the first sensor module is separate from the data from the additional set of sensors, and wherein the second computer readable map is separate from the first computer readable map;
 wherein, the at least one additional processor is configured to execute the computer readable instructions to,
  communicate instructions via a connection interface to the first processor, the instructions comprise, at least in part, location data of the robot measured by the at least one additional processor and additional set of sensors; and
  assign at least one additional task of the first set of autonomous tasks to the first processor of the first sensory module, wherein the at least one additional task comprises corresponding the location data to sensory data collected by the first set of sensors of the first sensor module, and communicating the sensory data and corresponding locations to a remote server.

2. The robotic system of claim 1, wherein,
the first sensory module comprises a connection interface coupled to a respective connection interface of the robotic system.

3. The robotic system of claim 2, wherein,
the connection interface of the first sensory module is configured based in part on a shape of the chassis or body of the robotic system.

4. The robotic system of claim 3, wherein,
the first sensory module is coupled and decoupled from the robotic system without modifications to the chassis of the robotic system.

5. The robotic system of claim 1, wherein,
the first sensory module is inoperable prior to being coupled to the at least one processor on the chassis or body.

6. The robotic system of claim 1, further comprising:
a second different sensory module coupled to the first sensory module, the first and second sensory module being in communication with the at least one processor of the robotic system.

7. The robotic system of claim 1, wherein the at least one processor of the robotic system is further configured to execute the instructions to:
perform a second set of autonomous tasks with the first sensory module coupled to the at least one processor on the chassis or body, the second set of autonomous tasks includes all of the tasks of the first set of tasks and one or more additional tasks based on the second computer readable map.

8. The robotic system of claim 1, wherein,
the first sensory module includes one of a camera and lights component, a light-detecting and ranging sensory component, a depth camera component, or one or more internal monitoring sensor components.

9. The robotic system of claim 1, wherein the execution of the computer readable instructions by the one or more processors of the first sensory module configures the one or more processors of the first sensory module to execute an image recognition model, the image recognition model is configured to identify features in the one or more images captured by either the first set of sensors on the first sensory module or the additional set of sensors.

10. A method being performed by a robotic system, comprising
collecting, by a first set of sensors on a first sensory module, data corresponding to internal or external characteristics of the robotic system, the first sensory module being configured to be coupled or decoupled from the robotic system;
collecting, by an additional set of sensors on a chassis or body of the robotic system, data corresponding to internal or external characteristics of the robotic system, wherein the additional set of sensors is separate and distinct from the first set of sensors;
performing, by at least one processor on the chassis or body of the robotic system and upon execution of computer readable instructions associated with the additional set of sensors in communication with the processor stored on a non-transitory computer readable medium, a first set of autonomous tasks by producing a first computer readable map of an environment using data from the additional set of sensors;

upon detecting a coupling of the sensory module to the robot chassis, producing, by the at least one processor upon execution of the computer readable instructions associated with the first set of sensors on the first sensory module and computer readable instructions associated with the additional set of sensors not on the first sensory module, a second computer readable map based on data from the first set of sensors and the additional set of sensors, wherein the second computer readable map is different from the first computer readable map;

communicate, by the at least one processor, instructions via a connection interface to the first processor, the instructions comprise, at least in part, location data of the robot measured by the at least one processor and additional set of sensors; and assign at least one additional task of the first set of autonomous tasks to the first processor, the at least one additional task comprises corresponding the location data to sensory data collected by the first set of sensors and communicating the sensory data and corresponding locations to a remote server.

11. The method of claim 10, wherein the first sensory module comprises a connection interface coupled to a respective connection interface of the robotic system.

12. The method of claim 11, wherein the connection interface of the first sensory module is configured based in part on a shape of a chassis or body of the robotic system.

13. The method of claim 12, wherein the first sensory module is coupled and decoupled from the robotic system without modifications to the chassis of the robotic system.

14. The method of claim 10, wherein the first sensory module is inoperable prior to being coupled to the at least one processor on the chassis or body of the robotic system.

15. The method of claim 10, further comprising: coupling a second different sensory module, the second sensory module being coupled to the first sensory module, the first and second sensory module being in communication with the at least one processor of the robotic system.

16. The method of claim 10, further comprising: performing, by the processor upon execution of the computer readable instructions, a second set of autonomous tasks with the first sensory module, the second set of autonomous tasks includes all of the tasks of the first set of tasks and one or more additional tasks based on the second computer readable map.

17. The method of claim 10, wherein the first sensory module includes one of a camera and lights component, a light-detecting and ranging sensory component, a depth camera component, or one or more internal monitoring sensor components.

18. The method of claim 10, wherein the execution of the computer readable instructions by the one or more processors of the first sensory module configures the one or more processors of the first sensory module to execute an image recognition model, the image recognition model is configured to identify features in the one or more images captured by either the first set of sensors on the sensory module or the additional set of sensors.

19. The robotic system of claim 1, wherein, the second computer readable map is produced at least in part using the additional set of sensors, the additional set of sensors capture images; and the second computer readable map includes one or more features localized thereon, the features being sensed by the first set of sensors on the first sensory module, the localization is based on data from the additional set of sensors.

20. The method of claim 10, wherein, the second computer readable map is produced at least in part using the additional set of sensors; and the second computer readable map includes one or more features localized thereon, the features being sensed by the first set of sensors on the first sensory module, the localization is based on data from the additional set of sensors.

* * * * *